US012700955B2

(12) United States Patent
Yin et al.

(10) Patent No.: US 12,700,955 B2
(45) Date of Patent: Aug. 4, 2026

(54) JOINT REPORTING AND UCI MULTIPLEXING OF HARQ-ACK WITH DIFFERENT PRIORITIES AND SR

(71) Applicant: SHARP KABUSHIKI KAISHA, Sakai City (JP)

(72) Inventors: Zhanping Yin, Vancouver, WA (US); Kazunari Yokomakura, Sakai City (JP); Kai Ying, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 430 days.

(21) Appl. No.: 18/269,749

(22) PCT Filed: Dec. 24, 2021

(86) PCT No.: PCT/JP2021/048417
§ 371 (c)(1),
(2) Date: Jun. 26, 2023

(87) PCT Pub. No.: WO2022/145397
PCT Pub. Date: Jul. 7, 2022

(65) Prior Publication Data
US 2024/0146466 A1 May 2, 2024

Related U.S. Application Data

(60) Provisional application No. 63/131,207, filed on Dec. 28, 2020.

(51) Int. Cl.
*H04L 1/1829* (2023.01)
*H04L 1/1607* (2023.01)

(52) U.S. Cl.
CPC .......... *H04L 1/1854* (2013.01); *H04L 1/1671* (2013.01)

(58) Field of Classification Search
CPC ... H04L 1/1854; H04L 1/1671; H04L 5/0055; H04L 1/1861; H04L 1/1614; H04W 72/21; H04W 72/569
See application file for complete search history.

(56) References Cited

U.S. PATENT DOCUMENTS

2022/0116960 A1* 4/2022 Yang ...................... H04L 1/1854
2023/0345472 A1* 10/2023 Takahashi ......... H04W 72/1268
2024/0107574 A1* 3/2024 Yamamoto ........... H04L 1/1861

FOREIGN PATENT DOCUMENTS

WO     WO-2022137659 A1 * 6/2022 ........... H04L 5/0091

OTHER PUBLICATIONS

Sharp, "Enhancements on intra-UE UCI multiplexing and PUSCH prioritization", R1-2101541, 3GPP TSG RAN WG1 #104-e, e-Meeting, Jan. 25-Feb. 5, 2021.

(Continued)

*Primary Examiner* — Sharmin Chowdhury
(74) *Attorney, Agent, or Firm* — ScienBiziP, P.C.

(57) ABSTRACT

A user equipment (UE) is described. The UE includes a processor configured to determine an uplink control information (UCI) multiplexing order for hybrid automatic repeat request-acknowledgement (HARQ-ACK) with different priorities and scheduling request (SR). The processor is also configured to multiplex the HARQ-ACK and the SR. The UE also includes transmitting circuitry configured to transmit the multiplexed HARQ-ACK and SR on a physical uplink control channel (PUCCH).

2 Claims, 19 Drawing Sheets

1900

Determine an uplink control information (UCI) multiplexing order for hybrid automatic repeat request-acknowledgement (HARQ-ACK) with different priorities and scheduling request (SR) — 1902

Multiplex the HARQ-ACK and the SR — 1904

Transmit the multiplexed HARQ-ACK and SR on a physical uplink control channel (PUCCH) — 1906

(56)  References Cited

OTHER PUBLICATIONS

Zte, "Discussion on enhanced intra-UE multiplexing", R1-2008824, 3GPP Tsg Ran WG1 #103-e, e-Meeting, October 26th - Nov. 13, 2020.
Panasonic, "Discussion on Intra-UE multiplexing and prioritization of different priority", R1-2008955, 3GPP Tsg Ran WG1 #103-e, e-Meeting, October 26th - Nov. 13, 2020.

* cited by examiner

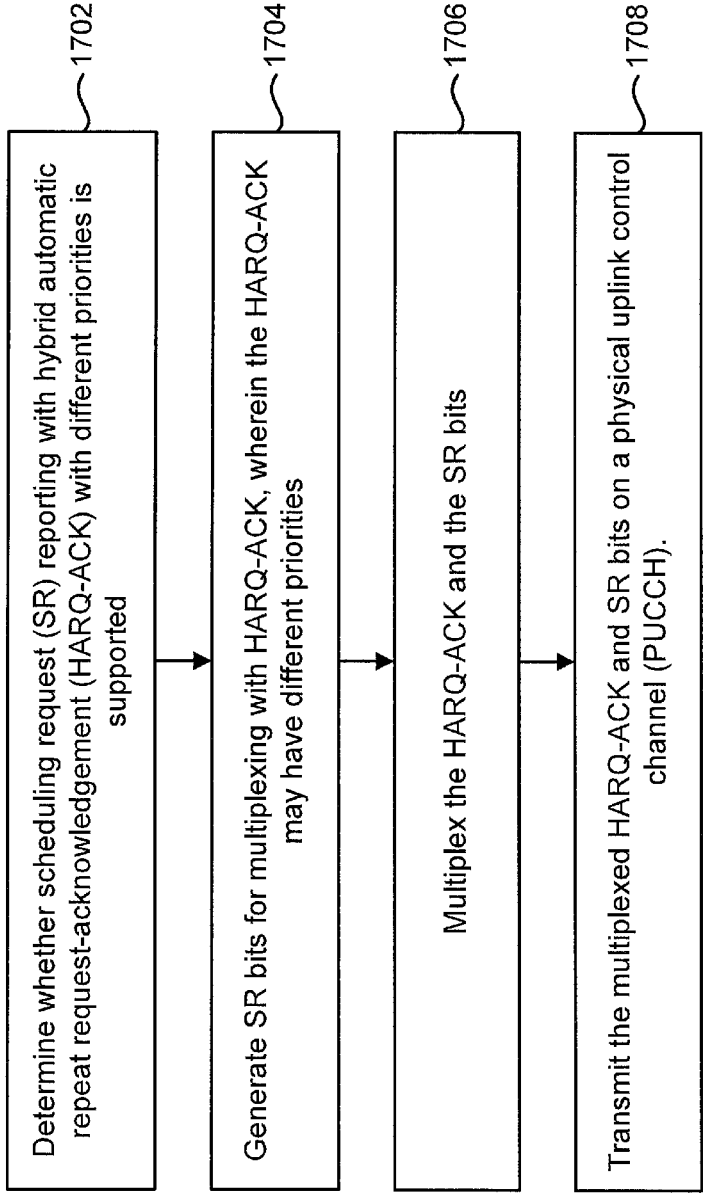

1702

Determine whether scheduling request (SR) reporting with hybrid automatic repeat request-acknowledgement (HARQ-ACK) with different priorities is supported

1704

Generate SR bits for multiplexing with HARQ-ACK, wherein the HARQ-ACK may have different priorities

1706

Multiplex the HARQ-ACK and the SR bits

1708

Transmit the multiplexed HARQ-ACK and SR bits on a physical uplink control channel (PUCCH).

Determine whether scheduling request (SR) reporting with hybrid automatic repeat request-acknowledgement (HARQ-ACK) with different priorities is supported

1804

Receive multiplexed HARQ-ACK and SR bits on a physical uplink control channel (PUCCH); the HARQ-ACK having different priorities

1902

Determine an uplink control information (UCI) multiplexing order for hybrid automatic repeat request-acknowledgement (HARQ-ACK) with different priorities and scheduling request (SR)

1904

Multiplex the HARQ-ACK and the SR

1906

Transmit the multiplexed HARQ-ACK and SR on a physical uplink control channel (PUCCH)

1900

2002

Determine an uplink control information (UCI) multiplexing order for hybrid automatic repeat request-acknowledgement (HARQ-ACK) with different priorities and scheduling request (SR)

2004

Receive multiplexed HARQ-ACK and SR on a physical uplink control channel (PUCCH), the HARQ-ACK having different priorities

2000

JOINT REPORTING AND UCI MULTIPLEXING OF HARQ-ACK WITH DIFFERENT PRIORITIES AND SR

CROSS REFERENCE

This Nonprovisional application claims priority under 35 U.S.C. § 119 on provisional Application No. 63/131,207 on Dec. 28, 2020, the entire contents of which are hereby incorporated by reference.

TECHNICAL FIELD

The present disclosure relates generally to communication systems. More specifically, the present disclosure relates to HARQ-ACK multiplexing.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: a processor configured to: determine multiplexing of UCI with different priorities is supported, and there are overlapping between PUCCH transmission with high priority hybrid automatic repeat request-acknowledgement (HARQ-ACK), PUCCH transmission with low priority HARQ-ACK, and at least one PUCCH resource for scheduling request (SR) with high priority, and determine an uplink control information (UCI) multiplexing order for hybrid automatic repeat request-acknowledgement (HARQ-ACK) with different priorities and scheduling request (SR); and multiplex the HARQ-ACK and the SR; and transmitting circuitry configured to transmit the multiplexed HARQ-ACK and SR on a physical uplink control channel (PUCCH) resource configured for high priority HARQ-ACK based on the total payloads.

In one example, a base station (gNB), comprising: a processor configured to determine multiplexing of UCI with different priorities is supported, and there are overlapping between PUCCH transmission with high priority hybrid automatic repeat request-acknowledgement (HARQ-ACK), PUCCH transmission with low priority HARQ-ACK, and at least one PUCCH resource for scheduling request (SR) with high priority, and determine an uplink control information (UCI) multiplexing order for hybrid automatic repeat request-acknowledgement (HARQ-ACK) with different priorities and scheduling request (SR); and receiving circuitry configured to receive multiplexed HARQ-ACK and SR on a physical uplink control channel (PUCCH) resource configured for high priority HARQ-ACK based on the total payloads, wherein the HARQ-ACK having different priorities.

In one example, a method by a user equipment (UE), comprising: determining multiplexing of UCI with different priorities is supported, and there are overlapping between PUCCH transmission with high priority hybrid automatic repeat request-acknowledgement (HARQ-ACK), PUCCH transmission with low priority HARQ-ACK, and at least one PUCCH resource for scheduling request (SR) with high priority, and determining an uplink control information (UCI) multiplexing order for hybrid automatic repeat request-acknowledgement (HARQ-ACK) with different priorities and scheduling request (SR); multiplexing the HARQ-ACK and the SR; and transmitting the multiplexed HARQ-ACK and SR on a physical uplink control channel (PUCCH).

BRIEF DESCRIPTION OF DRAWINGS

FIG. 17 is a flow diagram illustrating a method by a UE.

DESCRIPTION OF EMBODIMENTS

Figure 1:
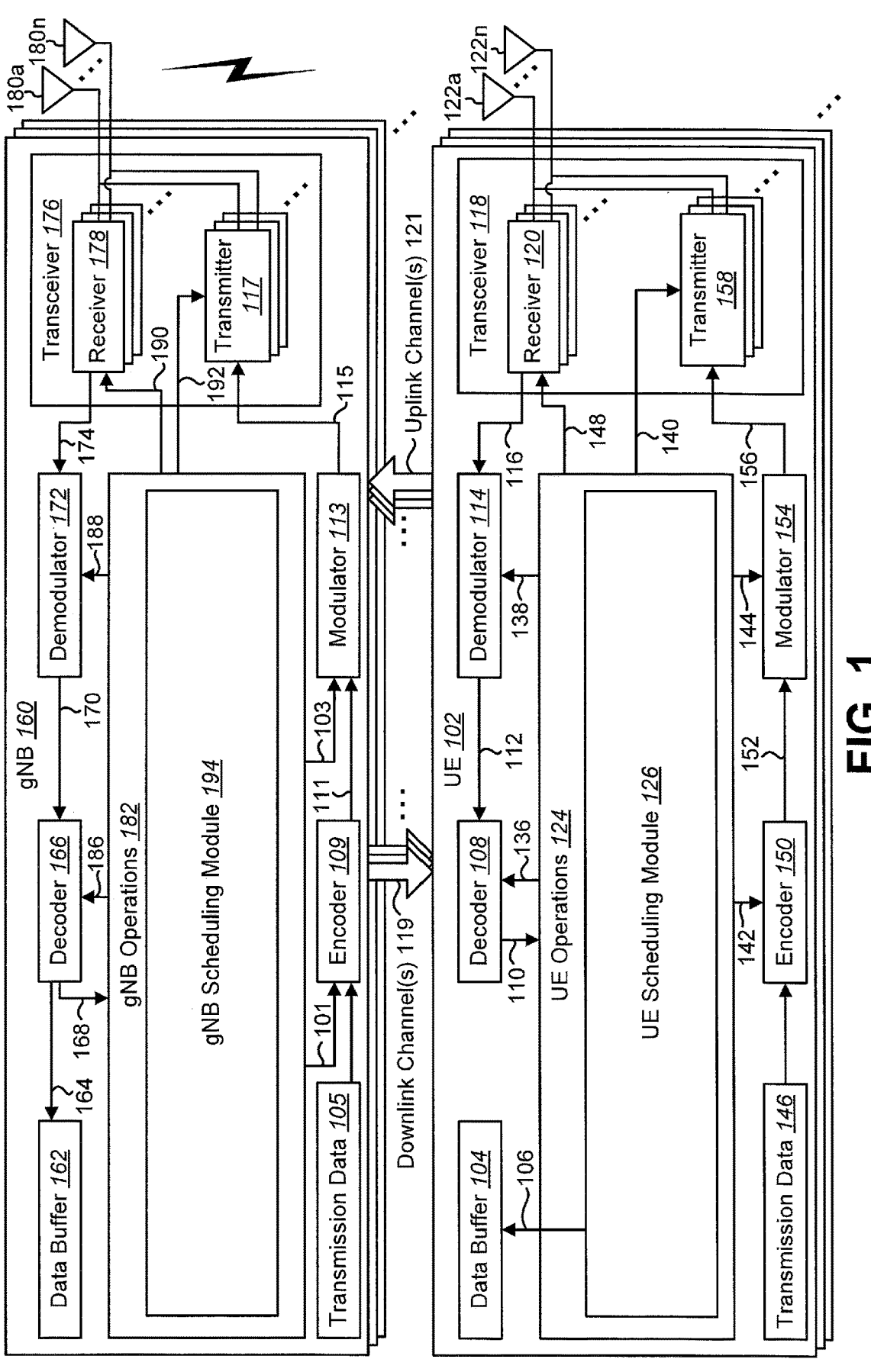
FIG. 1 is a block diagram illustrating one implementation of one or more gNBs and one or more UEs in which systems and methods for HARQ-ACK multiplexing may be implemented.

A user equipment (UE) is described. The UE includes a processor configured to determine whether scheduling request (SR) reporting with hybrid automatic repeat request-acknowledgement (HARQ-ACK) with different priorities is supported. The processor is also configured to generate SR bits for multiplexing HARQ-ACK, wherein the HARQ-ACK having different priorities. The processor is further configured to multiplex the HARQ-ACK and the SR bits. The UE also includes transmitting circuitry configured to transmit the multiplexed HARQ-ACK and SR bits on a physical uplink control channel (PUCCH).

In some examples, for a given priority, the SR bits may be generated and appended to HARQ-ACK bits with a same priority. In an approach, 1 SR bit is generated to represent a positive or negative SR for up to 2 bits of HARQ-ACK with PUCCH format 0 or PUCCH format 1. In another approach, SR bits are generated based on PUCCH format 2/3/4 regardless of HARQ-ACK payload size and PUCCH formats.

In some examples, the SR bits may be generated based on an overlapping condition between an original HARQ-ACK PUCCH resource and an SR PUCCH configuration of the same priority. In other examples, the SR bits may be generated based on an overlapping condition between a determined PUCCH resource for joint reporting and an SR PUCCH configuration of the same priority.

In some examples, the SR bits with low priority may be generated based on whether low priority SR reporting with high priority HARQ-ACK and low priority HARQ-ACK is supported. If supported, bits for low priority SR may be generated in addition to bits for high priority SR. If not supported, only bits for high priority SR are generated if present, and no bit for low priority SR is generated.

A base station (gNB) is also described. The gNB includes a processor configured to determine whether SR reporting with HARQ-ACK with different priorities is supported. The gNB also includes receiving circuitry configured to receive multiplexed HARQ-ACK and SR bits on a PUCCH. The HARQ-ACK having different priorities.

A method by a UE is also described. The method includes determining whether SR reporting with HARQ-ACK with different priorities is supported. The method also includes generating SR bits for multiplexing HARQ-ACK. The HARQ-ACK having different priorities. The method further includes multiplexing the HARQ-ACK and the SR bits. The method additionally includes transmitting the multiplexed HARQ-ACK and SR bits on a PUCCH.

A method by a gNB is also described. The method includes determining whether SR reporting with HARQ-ACK with different priorities is supported. The method also includes receiving multiplexed HARQ-ACK and SR bits on a PUCCH. The HARQ-ACK having different priorities.

A user equipment (UE) is described. The UE includes a processor configured to determine whether scheduling request (SR) reporting with hybrid automatic repeat request-acknowledgement (HARQ-ACK) with different priorities is supported. The processor is also configured to generate SR bits for multiplexing HARQ-ACK, wherein the HARQ-ACK having different priorities. The processor is further configured to multiplex the HARQ-ACK and the SR bits. The UE also includes transmitting circuitry configured to transmit the multiplexed HARQ-ACK and SR bits on a physical uplink control channel (PUCCH).

In some examples, for a given priority, the SR bits may be generated and appended to HARQ-ACK bits with a same priority. In an approach, 1 SR bit is generated to represent a positive or negative SR for up to 2 bits of HARQ-ACK with PUCCH format 0 or PUCCH format 1. In another approach, SR bits are generated based on PUCCH format 2/3/4 regardless of HARQ-ACK payload size and PUCCH formats.

In some examples, the SR bits may be generated based on an overlapping condition between an original HARQ-ACK PUCCH resource and an SR PUCCH configuration of the same priority. In other examples, the SR bits may be generated based on an overlapping condition between a determined PUCCH resource for joint reporting and an SR PUCCH configuration of the same priority.

In some examples, the SR bits with low priority may be generated based on whether low priority SR reporting with high priority HARQ-ACK and low priority HARQ-ACK is supported. If supported, bits for low priority SR may be generated in addition to bits for high priority SR. If not supported, only bits for high priority SR are generated if present, and no bit for low priority SR is generated.

A base station (gNB) is also described. The gNB includes a processor configured to determine whether SR reporting with HARQ-ACK with different priorities is supported. The gNB also includes receiving circuitry configured to receive multiplexed HARQ-ACK and SR bits on a PUCCH. The HARQ-ACK having different priorities.

A method by a UE is also described. The method includes determining whether SR reporting with HARQ-ACK with different priorities is supported. The method also includes generating SR bits for multiplexing HARQ-ACK. The HARQ-ACK having different priorities. The method further includes multiplexing the HARQ-ACK and the SR bits. The method additionally includes transmitting the multiplexed HARQ-ACK and SR bits on a PUCCH.

A method by a gNB is also described. The method includes determining whether SR reporting with HARQ-ACK with different priorities is supported. The method also includes receiving multiplexed HARQ-ACK and SR bits on a PUCCH. The HARQ-ACK having different priorities.

Another user equipment (UE) is described. The UE includes a processor configured to determine an uplink control information (UCI) multiplexing order for hybrid automatic repeat request-acknowledgement (HARQ-ACK) with different priorities and scheduling request (SR). The processor is also configured to multiplex the HARQ-ACK and the SR. The UE also includes transmitting circuitry configured to transmit the multiplexed HARQ-ACK and SR on a physical uplink control channel (PUCCH).

In some examples, HARQ-ACK and SR with a same priority may be multiplexed first. Low priority HARQ-ACK with or without SR may then be appended to high priority HARQ-ACK with or without SR. In an approach, both SRs with high priority and SRs with low priority may be reported. In another approach, only SRs with high priority may be reported.

In some examples, high priority HARQ-ACK and low priority HARQ-ACK may be multiplexed first, then SR bits may be generated and appended to joint HARQ-ACK bits. In an approach, the SR bits may be appended to the joint HARQ-ACK by counting SR with all priorities together based on SR indexes. In another approach, SR bits are appended to the joint HARQ-ACK by counting SRs separately based on SR indexes with each priority. In yet another approach, SR bits may be appended to the joint HARQ-ACK with SRs with high priorities only.

In some examples, selection of the UCI multiplexing order may be determined based on whether low priority SR reporting with high priority HARQ-ACK and low priority HARQ-ACK low priority SR is supported.

Another base station (gNB) is also described. The gNB includes a processor configured to determine a UCI multiplexing order for HARQ-ACK with different priorities and SR. The gNB also includes receiving circuitry configured to receive multiplexed HARQ-ACK and SR on a PUCCH. The HARQ-ACK having different priorities.

Another method by a UE. The method includes determining a UCI multiplexing order for HARQ-ACK with different priorities and SR. The method also includes multiplexing the HARQ-ACK and the SR. The method further includes transmitting the multiplexed HARQ-ACK and SR on a PUCCH.

Another method by a gNB is also described. The method includes determining a UCI multiplexing order for HARQ-ACK with different priorities and SR. the method also includes receiving multiplexed HARQ-ACK and SR on a PUCCH. The HARQ-ACK having different priorities.

The 3rd Generation Partnership Project, also referred to as "3GPP," is a collaboration agreement that aims to define globally applicable technical specifications and technical reports for third, fourth, and fifth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14, 15, 16, 17, etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station or base station device.

Examples of scheduling request (SR) bit generation for HARQ-ACK multiplexing with different priorities are described herein. For example, methods to generate SR bits in the case that SR is reported together with HARQ-ACK with different priorities. For HARQ-ACK and SR with the same priority, with the existing methods, no SR bit is appended to HARQ-ACK bits in case of up to 2 bits of HARQ-ACK using PUCCH format 0 or PUCCH format 1. For more than 2 bits of HARQ-ACK with PUCCH format 2 or PUCCH format 3 or PUCCH format 4 (PUCCH format 2/3/4), the SR bits are appended to the HARQ-ACK bits based on the number of overlapping SR PUCCH configurations with the HARQ-ACK PUCCH resource. In the case of SR reporting together with HARQ-ACK with different priorities, how to generate the SR bits are described herein (e.g., for a HARQ-ACK codebook up to 2 bits). In the following, PUCCH format 2/3/4 is equivalent to PUCCH format 2 or PUCCH format 3 or PUCCH format 4.

Additionally, examples of joint reporting and UCI multiplexing of HARQ-ACK with different priorities and SR are described herein. For example, methods to determine the orders of HARQ-ACK bits and SR bits in case of UCI multiplexing with different priorities. Currently, for the same priority, different methods are used for joint reporting of SR with HARQ-ACK with the same priority. How to multiplex SR with both high priority HARQ-ACK and low priority HARQ-ACK is described herein.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for HARQ-ACK multiplexing may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

In some examples, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR) signals. The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. For example, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104, and a UE operations module 124. For example, one or more reception and/or transmission paths may be implemented in the UE 102. For convenience, only a single transceiver 118, decoder 108, demodulator 114, encoder 150, and modulator 154 are illustrated in the UE 102, though multiple parallel elements (e.g., transceivers 118, decoders 108, demodulators 114, encoders 150, and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126. In some examples, the UE scheduling module 126 may be utilized to perform joint reporting of HARQ-ACK and SR with different priorities as described herein.

A high priority UCI may be a high priority HARQ-ACK or a high priority SR. A high priority HARQ-ACK corresponds to a high priority PDSCH transmission. The priority of a scheduled PDSCH transmission may be determined by the priority indication in the scheduling DCI. The priority of a SPS PDSCH transmission may be configured by higher layer signaling. A high priority PUCCH resource may be used to report high priority HARQ-ACK with or without SR. A high priority PDSCH, HARQ-ACK or PUCCH resource may be configured to support URLLC services. The high priority may be configured with a priority index 1. Thus, a high priority HARQ-ACK is a HARQ-ACK with priority index 1, a high priority SR is a SR with priority index 1, a high priority PUCCH transmission is a PUCCH transmission on a PUCCH resource with priority index 1.

A low priority UCI may be a low priority HARQ-ACK or a low priority SR, or a CSI report, etc. A low priority HARQ-ACK may correspond to a low priority PDSCH transmission. The priority of a scheduled PDSCH transmission may be determined by the priority indication in the scheduling DCI. The priority of a SPS PDSCH transmission may be configured by higher layer signaling. A low priority PUCCH resource may be used to report low priority UCI. A low priority PDSCH, HARQ-ACK or PUCCH resource may be configured to support eMBB services. The low priority may be configured with a priority index 0. Thus, a low priority HARQ-ACK is a HARQ-ACK with priority index 0, a low priority SR is a SR with priority index 0, a low priority PUCCH transmission is a PUCCH transmission on a PUCCH resource with priority index 0.

For HARQ-ACK priorities, if a UE is provided with pdsch-HARQ-ACK-Codebook-List, the UE can be indicated by pdsch-HARQ-ACK-Codebook-List to generate one or two HARQ-ACK codebooks. If the UE is indicated to generate two HARQ-ACK codebooks, then a first HARQ-ACK codebook is associated with a PUCCH of priority index 0 and a second HARQ-ACK codebook is associated with a PUCCH of priority index 1.

For SR priorities, a UE can be configured by SchedulingRequestResourceConfig a set of configurations for SR in a PUCCH transmission using either PUCCH format 0 or PUCCH format 1. A UE can be configured by schedulingRequestIDForBFR a configuration for Link Recovery Request (LRR) in a PUCCH transmission using either PUCCH format 0 or PUCCH format 1. The UE can be configured, by schedulingRequestPriority in SchedulingRequestResourceConfig, a priority index 0 or a priority index 1 for the SR.

A PUSCH or a PUCCH, including repetitions if any, can be of priority index 0 or of priority index 1. If a priority index is not provided for a PUSCH or a PUCCH, the priority index is 0. If in an active DL BWP a UE monitors PDCCH either for detection of DCI format 0_1 and DCI format 1_1 or for detection of DCI format 0_2 and DCI format 1_2, a priority index can be provided by a priority indicator field. If a UE indicates a capability to monitor, in an active DL BWP, PDCCH for detection of DCI format 0_1 and DCI format 1_1 and for detection of DCI format 0_2 and DCI format 1_2, a DCI format 0_1 or a DCI format 0_2 can schedule a PUSCH transmission of any priority and a DCI format 1_1 or a DCI format 1_2 can schedule a PDSCH reception and trigger a PUCCH transmission with corresponding HARQ-ACK information of any priority. If, after resolving overlapping for PUCCH and/or PUSCH transmissions of a same priority index, a UE determines to transmit a first PUCCH of larger priority index, a PUSCH or a second PUCCH of smaller priority index, and a transmission of the first PUCCH would overlap in time with a transmission of the PUSCH or the second PUCCH, the UE does not transmit the PUSCH or the second PUCCH. If, after resolving overlapping for PUCCH and/or PUSCH transmissions of a same priority index, a UE determines to transmit a PUSCH of larger priority index, a PUCCH of smaller priority index, and a transmission of the PUSCH would overlap in time with a transmission of the PUCCH, the UE does not transmit the PUCCH. If, after resolving overlapping for PUCCH and/or PUSCH transmissions of a same priority index, a UE determines to transmit a first PUSCH of larger priority index on a serving cell, a second PUSCH of smaller priority index on the serving cell, and a transmission of the first PUSCH would overlap in time with a transmission of the second PUSCH, the UE does not transmit the second PUSCH, where at least one of the two PUSCH is not scheduled by a DCI format.

In NR Rel-16, a UE can only multiplex UCIs with same priority index in a PUCCH or a PUSCH. A PUCCH or a PUSCH is assumed to have a same priority index as a priority index of UCIs a UE multiplexes in the PUCCH or the PUSCH. For intra-UE collision between uplink channels with different priorities, the uplink channel with high priority is transmitted, and the low priority channel is dropped.

UCI multiplexing enhancement configurations and conditions are described herein. In NR, up to 8 SR can be configured. In NR Rel-16, joint HARQ-ACK and SR reporting is supported only for the same priority.

For low priority HARQ-ACK codebook, HARQ-ACK codebook with priority index 0, the PUCCH resources may be configured at slot level or subslot level. However, only one PUCCH carrying low priority HARQ-ACK can be reported in a slot. For PUCCH carrying high priority HARQ-ACK, more than 2 PUCCH transmissions may be supported in a slot.

In Rel-16, the channel dropping rule is defined so that the high priority channel is transmitted, and the low priority channel is dropped in case of channel overlapping. And dropping timelines are defined for different types of UL channels and UCI types.

In NR Rel-17, UCI multiplexing between different priorities will be supported. To separate from the Rel-16 limitation of UCI multiplexing within the same priority, one or more RRC parameters can be introduced and configured by higher layer signaling.

A new RRC configuration can be specified to allow multiplexing of UCI with different priorities on a single UL transmission (e.g., a parameter of UCImux-r17, can be configured to allow multiplexing of UCI with different priorities supported in Rel-17. The same parameter UCImux-r17 may be configured for both PUCCH and PUSCH.

Alternatively, separate RRC parameters can be configured for PUCCH and PUSCH. For example, a parameter of UCImux-PUCCH-r17 or multiUCI-PUCCH-r17, can be configured to allow multiplexing of UCI with different priorities on PUCCH in Rel-17. A separate parameter of UCImux-PUSCH-r17 can be configured to allow multiplexing of UCI on PUSCH with different priorities in Rel-17.

To support joint reporting and multiplexing of HARQ-ACK with different priorities on PUCCH, a new HARQ-ACK report mode, or a new RRC parameters can be defined (e.g., Joint-HARQ-ACK-PUCCH, multi-HARQ-ACK-PUCCH, or mux-HARQ-ACK-PUCCH). In general, the SR may be reported together with HARQ-ACK of the same priority.

Additionally, or alternatively, the support of joint reporting and multiplexing of HARQ-ACK with different priorities on PUCCH may be dynamically indicated by DCI. For example, a bit in the scheduling DCI of a PDSCH that associated with the PUCCH in the given slot can indicate whether HARQ-ACK multiplexing of different priorities is allowed. In one method, the indication is by the last scheduling DCI of a PDSCH with priority index 1 that associated with the PUCCH in the given slot. Alternatively or additionally, the indication is by the last scheduling DCI of a PDSCH with priority index 0 that associated with the PUCCH in the given slot.

For UCI multiplexing on PUCCH, at least the following scenarios may be supported. One scenario includes multiplexing a high-priority HARQ-ACK and a low-priority HARQ-ACK into a PUCCH. Another scenario includes multiplexing a low-priority HARQ-ACK and a high-priority SR into a PUCCH for some HARQ-ACK/SR PUCCH format combinations. Yet another scenario includes multiplexing a low-priority HARQ-ACK, a high-priority HARQ-ACK and a high-priority SR into a PUCCH.

In general, for a high priority UCI (e.g. HARQ-ACK or SR) multiplexing with low priority UCI on a single PUCCH, the low priority PUCCH should satisfy the dropping timeline in Rel-16, so that the low priority PUCCH can be fully dropped. In other words, the report of the high priority UCI on the high PUCCH is known before the starting symbol of the low priority PUCCH for the low priority UCI. Thus, the timeline is defined based on some processing time and UE capabilities, e.g. a Tproc,2+d1 after a last symbol of the corresponding PDCCH reception. Otherwise, if the low priority PUCCH transmission is already started, the existing channel dropping method should be used, so that the high priority PUCCH is transmitted and the low priority PUCCH is dropped. Furthermore, extra processing time may be added to the dropping timeline to perform multiplexing of UCIs with different priorities. The extra processing time may be defined by a number of symbols (e.g., 1, 2, 3 symbols) depending on UE capabilities. The extra processing time may be determined by the type of UCIs with different priorities (e.g., multiplexing HARQ-ACK with different priorities may require a longer multiplexing processing time than a HARQ-ACK with SR with different priorities).

If the multiplexing timeline requirement is satisfied, multiplexing of UCI with different priorities on a single uplink channel can be performed if configured and enabled. The examples described herein provide methods for multiplexing a low-priority HARQ-ACK, a high-priority HARQ-ACK and an SR into a PUCCH for some HARQ-ACK/SR PUCCH format combinations. At least the SR with priority index 1 (e.g., high priority SR) should be supported for joint reporting with HARQ-ACK with different priorities. However, the SR with priority index 0 (e.g., low priority SR) may also be supported to avoid dropping of positive low priority SR.

In some examples, a UE may be provided two PUCCH-Config. If the UE is provided subslotLengthForPUCCH-r16 in the first PUCCH-Config, the PUCCH resource for any SR configuration with priority index 0 or any CSI report configuration in any PUCCH-Config may be within the subslotLengthForPUCCH-r16 symbols in the first PUCCH-Config. If the UE is provided subslotLengthForPUCCH-r16 in the second PUCCH-Config, the PUCCH resource for any SR configuration with priority index 1 in any PUCCH-Config may be within the subslotLengthForPUCCH-r16 symbols in the second PUCCH-Config.

In some examples, if a UE is not provided subslotLength-ForPUCCH, a slot for an associated PUCCH transmission may include all symbols in a slot, 14 symbols with normal cyclic prefix or 12 symbols with extended cyclic prefix. And if a UE is provided subslotLength-ForPUCCH, a slot for an associated PUCCH transmission may include a number of symbols indicated by subslotLength-ForPUCCH.

Examples of scheduling request (SR) bits generation for joint reporting with HARQ-ACK of different priorities is described herein. In NR, the SR can be joint reported with HARQ-ACK of the same priority on a single PUCCH, i.e., high priority SR can only be joint reported with a high priority HARQ-ACK, and low priority SR can only be joint reported with low priority HARQ-ACK. Furthermore, different joint reporting methods may be used for different HARQ-ACK and SR PUCCH formats.

In the following, a UE is configured to transmit K PUCCHs for respective K SRs in a slot, as determined by a set of schedulingRequestResourceId and schedulingRequestIDForBFR, with SR transmission occasions that would overlap with a transmission of a PUCCH with HARQ-ACK information from the UE in the slot or with a transmission of a PUCCH with CSI report(s) from the UE in the slot.

Thus, the joint reporting of SR with up to 2 bits of HARQ-ACK, no extra SR bits are appended to the HARQ-ACK. A positive SR may be represented by a different cyclic shift or different PUCCH resource. There may be no difference in the HARQ-ACK PUCCH transmission in case of negative SR or no SR.

If HARQ-ACK is reported on a PUCCH resource with PUCCH format 0, a positive SR may be represented by the PUCCH sequence with a different cyclic shift value from negative SR or no SR. If a UE would transmit a PUCCH with positive SR and at most two HARQ-ACK information bits in a resource using PUCCH format 0, the UE may transmit the PUCCH in the resource using PUCCH format 0 in PRB(s) for HARQ-ACK information. The UE may determine a value of $m_O$ and $m_{CS}$ for computing a value of cyclic shift $\alpha$ where $m_O$ is provided by initialcyclicshift of PUCCH-format0, and $m_{CS}$ is determined from the value of one HARQ-ACK information bit or from the values of two HARQ-ACK information bits as in Table-1 and Table-2, respectively. Table 1 illustrates an example of mapping of values for one HARQ-ACK information bit and positive SR to sequences for PUCCH format 0. Table 2 illustrates an example of mapping of values for two HARQ-ACK information bits and positive SR to sequences for PUCCH format 0.

TABLE 1

| HARQ-ACK Value | 0 | 1 |
|---|---|---|
| Sequence cyclic shift | $m_{CS} = 3$ | $m_{CS} = 9$ |

TABLE 2

| HARQ-ACK Value | {0, 0} | {0, 1} | {1, 1} | {1, 0} |
|---|---|---|---|---|
| Sequence cyclic shift | $m_{CS} = 1$ | $m_{CS} = 4$ | $m_{CS} = 7$ | $m_{CS} = 10$ |

If the UE would transmit negative SR and a PUCCH with at most two HARQ-ACK information bits in a resource using PUCCH format 0, the UE may transmit the PUCCH in the resource using PUCCH format 0 for HARQ-ACK information as described below. If a UE transmits a PUCCH with HARQ-ACK information using PUCCH format 0, the UE may determine values $m_O$ and $m_{CS}$ for computing a value of cyclic shift $\alpha$ where $m_O$ is provided by initialCyclicShift of PUCCH-format0 or, if initialCyclicShift is not provided, by the initial cyclic shift index and $m_{CS}$ is determined from the value of one HARQ-ACK information bit or from the values of two HARQ-ACK information bits as in Table-3 and Table-4, respectively. Table-3 illustrates an example of mapping of values for one HARQ-ACK information bit to sequences for PUCCH format 0. Table-4 illustrates an example of mapping of values for two HARQ-ACK information bits to sequences for PUCCH format 0.

TABLE 3

| HARQ-ACK Value | 0 | 1 |
|---|---|---|
| Sequence cyclic shift | $m_{CS} = 0$ | $m_{CS} = 6$ |

TABLE 4

| HARQ-ACK Value | {0, 0} | {0, 1} | {1, 1} | (1, 0} |
|---|---|---|---|---|
| Sequence cyclic shift | $m_{CS} = 0$ | $m_{CS} = 3$ | $m_{CS} = 6$ | $m_{CS} = 9$ |

In some examples, HARQ-ACK may be reported on a PUCCH resource with PUCCH format 1. In this case, if the PUCCH resource with a positive SR is configured with PUCCH format 1, the HARQ-ACK bits may be reported on the PUCCH format 1 resource for the positive SR. The HARQ-ACK is reported on the HARQ-ACK PUCCH resource in case of a negative SR or no SR to be reported. In another example, if the PUCCH resource with a positive SR is configured with PUCCH format 0, only the HARQ-ACK is reported on the HARQ-ACK PUCCH resource, and the positive SR is dropped.

If a UE would transmit SR in a resource using PUCCH format 0 and HARQ-ACK information bits in a resource using PUCCH format 1 in a slot, the UE may transmit only a PUCCH with the HARQ-ACK information bits in the resource using PUCCH format 1. No SR can be reported in this case regardless of positive or negative SR.

If the UE would transmit positive SR in a first resource using PUCCH format 1 and at most two HARQ-ACK information bits in a second resource using PUCCH format 1 in a slot, the UE may transmit a PUCCH with HARQ-ACK information bits in the first resource using PUCCH format 1. If a UE would not transmit a positive SR in a resource using PUCCH format 1 and would transmit at most two HARQ-ACK information bits in a resource using PUCCH format 1 in a slot, the UE may transmit a PUCCH in the resource using PUCCH format 1 for HARQ-ACK information.

As a summary, for up to 2 bits of HARQ-ACK, only positive SR may be reported with different approaches depending on the HARQ-ACK and SR PUCCH format combinations. No extra bits are added to the HARQ-ACK codebook for a positive or negative SR. However, it can be viewed as an implicit bit by the different CS on PUCCH format 0 or the selection between HARQ-ACK and SR PUCCH resources with PUCCH format 1.

On the other hand, for more than 2 bits of HARQ-ACK, the HARQ-ACK is reported on a PUCCH resource for HARQ-ACK with PUCCH format 2/3/4, SR bit(s) is appended to HARQ-ACK bits and report on the HARQ-ACK PUCCH resource. For HARQ-ACK codebook with a given priority, the number of SR bits to be appended to the HARQ-ACK bits is determined by the number of overlapping SR PUCCH resources with the same priority. The SR bits are appended regardless of SR status.

If a UE would transmit a PUCCH with $O_{ACK}$ HARQ-ACK information bits in a resource using PUCCH format 2 or PUCCH format 3 or PUCCH format 4 in a slot, $\lceil \log_2 (K+1) \rceil$ bits representing a negative or positive SR, in ascending order of the values of schedulingRequestResourceId and schedulingRequestIDForBFR, are appended to the HARQ-ACK information bits and the UE transmits the combined $O_{UCI} = O_{ACK} + \lceil \log_2(K+1) \rceil$ UCI bits in a PUCCH using a resource with PUCCH format 2 or PUCCH format 3 or PUCCH format 4 that the UE determines 3. If one of the SRs is a positive LRR, the value of the $\lceil \log_2(K+1) \rceil$ bits indicates the positive LRR. An all-zero value for the $\lceil \log_2 (K+1) \rceil$ bits represents a negative SR value across all K SRs.

Some examples of issues for SR bits generation with multiplexing of HARQ-ACK with different priorities are described herein. For UCI multiplexing on PUCCH, multiplexing a low-priority HARQ-ACK, a high-priority HARQ-ACK and a high-priority SR into a PUCCH will be supported. To support this, the SR should be generated in order to joint report with HARQ-ACK bits with different priorities.

There are several issues to be solved for this. First of all, for HARQ-ACK up to 2 bits with PUCCH format 0 or PUCCH format 1, current methods of joint reporting of SR and HARQ-ACK with the same priority does not multiplex the HARQ-ACK with extra SR bits. The PUCCH for joint report of HARQ-ACK and SR still carries two bits of payload. Therefore, for a HARQ-ACK codebook with up to 2 bits, methods should be specified on how to differentiate the HARQ-ACK only and HARQ-ACK with SR in case of multiplexing of HARQ-ACK with different priorities. Additionally, for a HARQ-ACK codebook with up to 2 bits, methods should be specified on how to determine the number of SR bits for a HARQ-ACK codebook up to 2 bits in the case where there are overlapping SR PUCCH resources with the HARQ-ACK PUCCH resource.

Secondly, for more than 2 bits of HARQ-ACK and joint reporting of HARQ-ACK and SR with the same priority on PUCCH format 2/3/4, the overlapping SRs are determined based on the PUCCH resource for HARQ-ACK reporting. However, in the case of HARQ-ACK multiplexing with different priorities, the PUCCH resource for the HARQ-ACK with different priorities may be different from the original HARQ-ACK PUCCH resource. For example, for up to 2 bits of HARQ-ACK, PUCCH format 0 or PUCCH format 1 is used, and the multiplexed HARQ-ACK may be reported on a PUCCH Format 2/3/4. The location of the PUCCH resources may be quite different. Similarly, for more than 2 bits of HARQ-ACK, the PUCCH resource for joint reported of HARQ-ACK with different priorities may be different from the PUCCH resource for the HARQ-ACK of a given priority. Thus, how to determine the overlapping SR PUCCH resources and the SR bits with the HARQ-ACK should be clarified.

Thirdly, how to perform multiplexing of HARQ-ACK and SR with different priorities may be an issue. Both the UCI multiplexing order and the number of SR bits should be specified. In the following, examples to address the above three issues are described in detail.

Examples of SR bits generation for HARQ-ACK multiplexing with different priorities are described herein. For joint reporting of high priority HARQ-ACK with or without SR and low priority HARQ-ACK with and without SR, this disclosure deals with the issues of how to differentiate HARQ-ACK only and HARQ-ACK with SR, and how to determine the number of SR bits.

If a transmission of a PUCCH with HARQ-ACK information with high priority would overlap with a transmission of a PUCCH with HARQ-ACK information with low priority, and also with one or more SR transmission occasions that would overlap with the PUCCH with HARQ-ACK information from the UE in the slot, the HARQ-ACK with high priority and the HARQ-ACK with low priority and the SR may be reported jointly on a single PUCCH. At least the SR with priority index 1 may be jointly reported with the HARQ-ACK of priority index 1 and HARQ-ACK of priority index 0. Furthermore, SR with priority index 0 may also be jointly reported with the HARQ-ACK of priority index 1 and HARQ-ACK of priority index 0 and SR with priority index 1.

In a first method (Method 1), only 1 bit is used to indicate SR for up to 2 bits of HARQ-ACK codebook. Following the principle of existing HARQ-ACK and SR multiplexing, for a HARQ-ACK up to 2 bits for a given priority to be reported on a PUCCH resource with PUCCH format 0 or PUCCH format 1, if there is no configured PUCCH resource for SR with a given priority overlaps with the PUCCH resource for the HARQ-ACK with the given priority, no SR bit is appended to HARQ-ACK. The HARQ-ACK bits for the given priority in HARQ-ACK multiplexing is HARQ-ACK only. On the other hand, if there is at least one configured PUCCH resource for SR with a given priority overlaps with the PUCCH resource for the HARQ-ACK with the given priority, SR bit should be generated to be reported jointly with the two HARQ-ACK codebooks with different priorities. However, for SR multiplexing with HARQ-ACK with different priorities, the codebook size for negative SR and positive SR will be different. This requires gNB to perform blind decoding based on different SR bits and SR state hypothesis.

Because there is at most two information HARQ-ACK bits for the given priority, it may be better to limit the SR to one bit if present. Thus, in Method 1, only 1 bit of SR is generated for a HARQ-ACK codebook with up to 2 bits.

For HARQ-ACK and SR with a given priority, a UE is configured to transmit K PUCCHs for respective K SRs in a slot, as determined by a set of schedulingRequestResourceId and schedulingRequestIDForBFR, with SR transmission occasions that would overlap with a transmission of a PUCCH with HARQ-ACK information from the UE in the slot or with a transmission of a PUCCH with CSI report(s) from the UE in the slot.

For a HARQ-ACK with at most two HARQ-ACK information bits for a given priority on PUCCH format 0 or PUCCH format 1, if there are K configured PUCCH resources for SRs with a given priority overlaps with the PUCCH resource for the HARQ-ACK with the given priority, a single SR bit is appended to HARQ-ACK bits for the given priority for HARQ-ACK multiplexing with different priorities. The HARQ-ACK bits for the given priority in HARQ-ACK multiplexing are HARQ-ACK with SR. If a positive SR is triggered on any of the overlapping SR, a positive SR is reported by appending a SR bit with "1" to the HARQ-ACK bits. A negative SR is reported by appending a SR bit with "0" to the HARQ-ACK bits.

This method can be used for HARQ-ACK with PUCCH format 0 or PUCCH format 1, and it is applicable to SR PUCCH resources with PUCCH format 0 or PUCCH format 1. Thus, a SR bit can be reported even if HARQ-ACK is configured with PUCCH format 1 and SR is configured with PUCCH format 0. This is an improvement over current HARQ-ACK and SR reporting for HARQ-ACK and SR with the same priority.

However, in the case of multiple overlapping SR PUCCH resources with the same priority and a positive SR, the SR index is not reported. Thus, the gNB knows there is a positive SR, but does not know which SR configuration is triggered.

As an alternative method of Method 1, the one SR bit may be appended to the HARQ-ACK codebook only if a positive SR is triggered. Thus, no SR bit is generated for negative SR, and a HARQ-ACK with negative SR is the same as HARQ-ACK without SR. However, this will result in different number of bits for a codebook with a positive SR and a negative SR. In case of HARQ-ACK PUCCH overlapping with at least one SR, the gNB need to perform bland decoding with two hypothesis of a negative SR and a positive SR.

In a second method (Method 2), SR bits may be generated with a unified method as SR collision with PUCCH format 2/3/4. With Method 1 above, only 1 bit is used to represent SR. If there are multiple SR PUCCH resources that overlap with the HARQ-ACK PUCCH, and if a positive SR is reported, the UE cannot indicate which SR configuration is triggered.

In order to provide extra information on which SR is positive in case of more than one SR PUCCH overlap with the HARQ-ACK PUCCH resource, a number of SR bits may be generated based on the number of SR PUCCH configurations that overlap with the HARQ-ACK PUCCH resource. If there is SR to be reported together with HARQ-ACK codebooks with different priorities, the total payload may be always more than 2 bits. Even with 1 bit of HARQ-ACK with priority index 1 and 1 bit of HARQ-ACK with priority index 0, and adding only one extra bit for SR, the total payload will be more than 2 bits. Thus, the multiplexed UCI bits should always be reported on a PUCCH resource using PUCCH format 2/3/4. Therefore, the SR generation method for a PUCCH resource using PUCCH format 2/3/4 may be reused for SR generation with up to 2 bits HARQ-ACK codebook using a PUCCH resource with PUCCH format 0 or PUCCH format 1.

In one approach (Approach 1), the SR bits are generated based on the overlapping conditions between the SR PUCCH configurations and the original HARQ-ACK PUCCH resource with PUCCH format 0 or PUCCH format 1. For a given priority, if a UE is configured to transmit K PUCCHs for respective K SRs in a slot, as determined by a set of schedulingRequestResourceId and schedulingRequestIDForBFR, with SR transmission occasions that would overlap with a transmission of a PUCCH with HARQ-ACK information from the UE in the slot. If a UE would transmit a PUCCH with no more than 2 bits $O_{ACK}$ HARQ-ACK information bits in a resource using PUCCH format 0 or PUCCH format 1 in a slot, $\lceil \log_2(K+1) \rceil$ bits representing a negative or positive SR, in ascending order of the values of schedulingRequestResourceId and schedulingRequestID-ForBFR, are appended to the HARQ-ACK information bits and the UE reports the combined $O_{UCI} = O_{ACK} + \lceil \log_2(K+1) \rceil$ UCI bits for the given priority in a PUCCH using a resource with PUCCH format 2 or PUCCH format 3 or PUCCH format 4 that the UE determines based on UCI payload of HARQ-ACK with or without SR for both high priority and low priority. If one of the SRs is a positive LRR, the value of the $\lceil \log_2(K+1) \rceil$ bits indicates the positive LRR. An all-zero value for the $\lceil \log_2(K+1) \rceil$ bits represents a negative SR value across all K SRs.

The same issue exists for SR generation with more than 2 bits of HARQ-ACK codebook with a given priority. The SR bits may be generated based on the overlapping conditions with the original HARQ-ACK PUCCH resource with PUCCH format 2/3/4.

For a given priority, if a UE is configured to transmit K PUCCHs for respective K SRs in a slot, as determined by a set of schedulingRequestResourceId and schedulingRequestIDForBFR, with SR transmission occasions that would overlap with a transmission of a PUCCH with HARQ-ACK information from the UE in the slot from the UE in the slot. If a UE would transmit a PUCCH with $O_{ACK}$ HARQ-ACK information bits in a resource using PUCCH format 2 or PUCCH format 3 or PUCCH format 4 in a slot, $\lceil \log_2(K+1) \rceil$ bits representing a negative or positive SR, in ascending order of the values of schedulingRequestResourceId and schedulingRequestIDForBFR, are appended to the HARQ-ACK information bits and the UE reports the combined $O_{UCI} = O_{ACK} + \lceil \log_2(K+1) \rceil$ UCI bits in a PUCCH using a resource with PUCCH format 2 or PUCCH format 3 or PUCCH format 4 that the UE determines for the joint UCI transmission. If one of the SRs is a positive LRR, the value of the $\lceil \log_2(K+1) \rceil$ bits indicates the positive LRR. An all-zero value for the $\lceil \log_2(K+1) \rceil$ bits represents a negative SR value across all K SRs.

Combined together, the method can be applied to all HARQ-ACK payloads and HARQ-ACK PUCCH formats as follows. For a given priority, if a UE is configured to transmit K PUCCHs for respective K SRs in a slot, as determined by a set of schedulingRequestResourceId and schedulingRequestIDForBFR, with SR transmission occasions that would overlap with a transmission of a PUCCH with HARQ-ACK information from the UE in the slot from the UE in the slot. If a UE would transmit a PUCCH with $O_{ACK}$ HARQ-ACK information bits in a PUCCH resource in a slot, $\lceil \log_2(K+1) \rceil$ bits representing a negative or positive SR, in ascending order of the values of schedulingRequestResourceId and schedulingRequestIDForBFR, are appended to the HARQ-ACK information bits and the UE reports the combined $O_{UCI}=O_{ACK}+\lceil \log_2(K+1) \rceil$ UCI bits in a PUCCH using a resource with PUCCH format 2 or PUCCH format 3 or PUCCH format 4 that the UE determines for the joint UCI transmission. If one of the SRs is a positive LRR, the value of the $\lceil \log_2(K+1) \rceil$ bits indicates the positive LRR. An all-zero value for the $\lceil \log_2(K+1) \rceil$ bits represents a negative SR value across all K SRs.

Because the joint HARQ-ACK with different priorities and SR is always more than 2 bits, the PUCCH resource used for the joint reporting is a PUCCH resource with PUCCH format 2/3/4, and is determined by the HARQ-ACK with or with SR payload with high priority and the HARQ-ACK with or with SR payload with low priority.

The PUCCH resource for joint UCI reporting is different from the original PUCCH format for the HARQ-ACK codebook with no more than 2 bits. The SR PUCCH overlapping conditions with the determined PUCCH with PUCCH format 2/3/4 may be different from the original PUCCH with PUCCH format 0 or PUCCH format 1. For example, the number of overlapping SR configurations may be different, a SR PUCCH overlaps with the original PUCCH may not overlap with the determined PUCCH for joint reporting, and a different SR configuration may overlap with the determined PUCCH for joint reporting but not overlap with the original PUCCH. The same issue exists for more than 2 bits of HARQ-ACK with PUCCH format 2/3/4. The PUCCH resource for joint UCI reporting is different from the original PUCCH format or resource due to different payload sizes. The SR PUCCH overlapping conditions with the determined PUCCH with PUCCH format 2/3/4 may be different from the original PUCCH.

Thus alternatively, in another approach (Approach 2), to represent the SR overlapping conditions, the SR bits may be generated based on the determined PUCCH resource for joint HARQ-ACK and SR reporting. The SR overlapping conditions should be evaluated with the selected HARQ-ACK PUCCH resource to determine the number of bits for SR. This approach is applicable to all HARQ-ACK payload sizes and the original HARQ-ACK PUCCH formats.

In this approach, the UE should perform the SR bits determination in several steps. In a first step (step 1), the UE may determine the HARQ-ACK codebooks of high priority and low priority. In a second step (step 2), the UE may determine a PUCCH resource with PUCCH format 2/3/4 based on the HARQ-ACK payloads of both high priority and low priority. In a third step (step 3), for each priority, the UE may determine the SR PUCCH resource overlapping conditions with the determined PUCCH resource. In a fourth step (step 4), for each priority, the UE may determine the number of SR bits to be appended to the HARQ-ACK of the same priority based on the overlapping conditions.

Thus, for a given priority, if a UE is configured to transmit K PUCCHs for respective K SRs in a slot, as determined by a set of schedulingRequestResourceId and schedulingRequestIDForBFR, with SR transmission occasions that would overlap with a transmission of a determined PUCCH with PUCCH format 2 or PUCCH format 3 or PUCCH format 4 for joint HARQ-ACK with different priorities from the UE in the slot, and if a UE would transmit a PUCCH with $O_{ACK}$ HARQ-ACK information bits in a resource in a slot, $\lceil \log_2 (K+1) \rceil$ bits representing a negative or positive SR, in ascending order of the values of schedulingRequestResourceId and schedulingRequestIDForBFR, are appended to the HARQ-ACK information bits and the UE reports the combined $O_{UCI}=O_{ACK}+\lceil \log_2(K+1) \rceil$ UCI bits for the given priority in a PUCCH using a resource with PUCCH format 2 or PUCCH format 3 or PUCCH format 4 that the UE determines based on UCI payload of HARQ-ACK with or without SR for both high priority and low priority. If one of the SRs is a positive LRR, the value of the $\lceil \log_2(K+1) \rceil$ bits indicates the positive LRR. An all-zero value for the $\lceil \log_2 (K+1) \rceil$ bits represents a negative SR value across all K SRs.

It should be noted that if the total payload of HARQ-ACK of different priorities with the generated SR bits cannot be reported with the determined PUCCH resource, the UE may re-select a PUCCH resource with PUCCH format 2/3/4 based on the HARQ-ACK with SR payloads of both high priority and low priority. Then the SR overlapping conditions should be re-evaluated to determine the number of SR bits for each priority based on the newly selected PUCCH resource (e.g., repeat step 3-4).

The determined PUCCH for HARQ-ACK multiplexing with or without SR may be a configured high priority PUCCH resource for HARQ-ACK with high priority, i.e, with priority index 1. The determined PUCCH for HARQ-ACK multiplexing with or without SR may be selected from a separately configured PUCCH resource sets for UCI multiplexing.

Both Method 1 and Method 2 above assume that bits for SR with a priority index are generated and appended to the HARQ-ACK bits with the same priority index. It is applicable for the case of HARQ-ACK with priority index 1 and SR with priority index 1, and the case of HARQ-ACK with priority index 0 and SR with priority index 0. In each case, the overlapping conditions are determined by counting only the SRs with the same priority as the HARQ-ACK.

The bits for SR with high priority should always be generated. However, the bit generation for SR with low priority may be skipped or the bits for SR with low priority may be dropped depending whether low priority SR reporting with high priority HARQ-ACK and low priority HARQ-ACK is supported. The support of low priority SR reporting with high priority HARQ-ACK and low priority HARQ-ACK may be fixed in the specification. The support of low priority SR reporting with high priority HARQ-ACK and low priority HARQ-ACK may be configured by higher layer signaling.

If low priority SR reporting with high priority HARQ-ACK and low priority HARQ-ACK is supported, the low priority SR bits should be generated. If low priority SR reporting with high priority HARQ-ACK and low priority HARQ-ACK is not supported, the low priority SR bits should not be generated or the generated low priority SR bits should be dropped.

Additionally with Method 2, the HARQ-ACK with priority index 1 and HARQ-ACK with priority index 0 may be joint first as a single HARQ-ACK codebook. The joint HARQ-ACK codebook priority may be considered as priority index 1. Thus, the bits for SR with priority index 1 may be generated and appended to the joint HARQ-ACK codebook. If low priority SR reporting with high priority HARQ-ACK and low priority HARQ-ACK is supported, the high priority SR and low priority SR may be counted jointly or separately to generate the bits for high priority SR and low priority SR.

Joint reporting and UCI multiplexing of HARQ-ACK with different priorities and SR are also described herein. If a transmission of a PUCCH with HARQ-ACK information with high priority would overlap with a transmission of a PUCCH with HARQ-ACK information with low priority, and also with one or more SR transmission occasions that would overlap with the PUCCH with HARQ-ACK information from the UE in the slot, the HARQ-ACK with high priority and the HARQ-ACK with low priority and the SR may be reported jointly on a single PUCCH. At least the high priority SR should be joint reported with HARQ-ACKs with different priorities. It is also beneficial to include the low priority SR, especially if there is a positive low priority SR and no positive high priority SR.

The sections above describe example of methods to determine the number of SR bits with HARQ-ACK of the same priority. Examples of detailed UCI multiplexing order are now described. Depending how the SR is concatenated with HARQ-ACK, different methods can be considered.

In a third method (Method 3), HARQ-ACK and SR of each priority is multiplexed first, then concatenated together. This method maintains the principle of collision resolution within the same priority first before collision resolution between different priorities.

In a first approach (Approach 1), both SRs with high priority (HP) and SRs with low priority (LP) can be reported. In one approach, both SRs with high priority and SRs with low priority can be reported. The UCI ordering is given by HP HARQ-ACK+HP SR+LP HARQ-ACK+LP SR.

For each HARQ-ACK codebook with a given priority, SR bits may be appended to HARQ-ACK bits. Thus, the resulting codebook size of HARQ-ACK with SR is different from the codebook size for HARQ-ACK without SR. The resulting codebook of HARQ-ACK with positive SR may be different from the codebook of HARQ-ACK without negative SR.

The low priority HARQ-ACK with or without SR can then be appended to the high priority HARQ-ACK with or without SR for multiplexing of HARQ-ACK (with or without SR) with different priorities. The resulting UCI information ordering is high priority HARQ-ACK, high priority SR (if available), low priority HARQ-ACK and low priority SR (if available).

The methods describe above for SR generation with HARQ-ACK of the same priority may be applied here. In one method, for no more than 2 bits HARQ-ACK codebook, one bit of SR can be generated. In another method, the bits for SR are generated with a unified method based on the number of overlapping SR PUCCH configurations with the HARQ-ACK of the same priority regardless of the HARQ-ACK payload size and HARQ-ACK PUCCH format.

In one approach (Approach 1-a), the bits representing SR with a priority index is generated based on the SR PUCCH overlapping conditions with the original HARQ-ACK PUCCH resource of the same priority. This approach is reasonable because the collision is handled within the same priority first. The same UE behavior is performed before the evaluation of collision with a channel with different priority. However, the collision conditions between the SR configurations and the original PUCCH resource for the HARQ-ACK with the given priority may be different from the collision conditions between the SR configurations and the final PUCCH resource for the joint UCI reporting.

In some examples, a UE may be configured to transmit K1 PUCCHs for respective K1 SRs in a slot, as determined by a set of schedulingRequestResourceId and schedulingRequestIDForBFR, with SR transmission occasions that would overlap with a transmission of a PUCCH with HARQ-ACK information with priority index 1 from the UE in the slot. If a UE would transmit a PUCCH with $O_{ACK\_1}$ HARQ-ACK information bits with priority index 1 in a resource in a slot, $\lceil \log_2(K1+1) \rceil$ bits representing a negative or positive SR with priority index 1, in ascending order of the values of schedulingRequestResourceId and schedulingRequestID-ForBFR, are appended to the HARQ-ACK information bits with priority index 1. If one of the SRs with low priority is a positive LRR, the value of the $\lceil \log_2(K1+1) \rceil$ bits indicates the positive LRR. An all-zero value for the $\lceil \log_2(K1+1) \rceil$ bits represents a negative SR value across K0 SRs with priority index 0. The UE generates a combined $O_{UCI\_1}=O_{ACK\_1}+\lceil \log_2(K1+1) \rceil$ UCI bits for the HARQ-ACK and SR with priority index 1.

If a UE is configured to transmit K0 PUCCHs for respective K0 SRs in a slot, as determined by a set of schedulingRequestResourceId and schedulingRequestLDForBFR, with SR transmission occasions that would overlap with a transmission of a PUCCH with HARQ-ACK information with priority index 0 from the UE in the slot. If a UE would transmit a PUCCH with $O_{ACK\_0}$ HARQ-ACK information bits with priority index 0 in a resource in a slot, $\lceil \log_2(K0+1) \rceil$ bits representing a negative or positive SR with priority index 0, in ascending order of the values of schedulingRequestResourceId and schedulingRequestIDForBFR, are appended to the HARQ-ACK information bits with priority index 0. If one of the SRs with low priority is a positive LRR, the value of the $\lceil \log_2(K0+1) \rceil$ bits indicates the positive LRR. An all-zero value for the $\lceil \log_2(K0+1) \rceil$ bits represents a negative SR value across K0 SRs with priority index 0. The UE generates a combined $O_{UCI\_0}=O_{ACK\_0}+\lceil \log_2(K0+1) \rceil$ UCI bits for the HARQ-ACK and SR with priority index 0.

The UE reports the combined $O_{UCI\_1}$ and $O_{UCI\_0}$ in a PUCCH using a resource with PUCCH format 2 or PUCCH format 3 or PUCCH format 4 that the UE determines based on UCI payload of HARQ-ACK with or without SR for both high priority and low priority.

If joint coding is used for UCI multiplexing with different priorities, the UE transmits $O_{UCI}=O_{UCI\_1}+O_{UCI\_0}=O_{ACK\_1}+\lceil \log_2(K1+1) \rceil+O_{ACK\_0}+\lceil \log_2(K0+1) \rceil$ UCI bits in a PUCCH using a resource with PUCCH format 2 or PUCCH format 3 or PUCCH format 4 that the UE determines based on total UCI payload $O_{UCI}$ of HARQ-ACK with or without SR for both high priority and low priority.

If separate coding is applied for UCI multiplexing with different priorities, the $O_{UCI\_1}$ and $O_{UCI\_0}$ UCI bits are separate encoded and rate matched with different maximum code rate on the determined PUCCH resource, where the PUCCH resource is determined jointly based on the payload sizes and maximum code rate of different priorities.

In another approach (Approach 1-b), the bits representing SR with a priority index is generated based on the SR PUCCH overlapping conditions with a determined PUCCH resource for the joint reporting of HARQ-ACK with or without SR and with HARQ-ACK of different priorities. This approach may be beneficial because all multiplexed UCI will be reported in the determined PUCCH resource, and the collision conditions between the SR configurations and the determined PUCCH may be different from the collision conditions between the SR configurations and the original PUCCH resource for the high priority HARQ-ACK and the original PUCCH resource for the low priority HARQ-ACK.

In this approach, the UE may perform the SR bits determination in several steps. In a first step (step 1), the UE may determine the HARQ-ACK codebooks of high priority and low priority. In a second step (step 2), the UE may determine a PUCCH resource with PUCCH format 2/3/4 based on the HARQ-ACK payloads of both high priority and low priority. In a third step (step 3), for each priority, the UE may determine the SR PUCCH resource overlapping conditions with the determined PUCCH resource. In a fourth step (step 4), for each priority, the UE may determine the number of SR bits to be appended to the HARQ-ACK of the same priority based on the overlapping conditions.

Considering SR with different priorities, a UE is configured to transmit K PUCCHs for respective K SRs in a slot, as determined by a set of schedulingRequestResourceId and schedulingRequestIDForBFR, with SR transmission occasions that would overlap with a transmission of a PUCCH for joint reporting of HARQ-ACK information with different priorities from the UE in the slot. Among the K overlapping SRs in a slot, there are K0 SRs with priority index 0 and K1 SRs with priority index 1, where K0≥0, K1≥0, and K0+K1=K. That is, there are a total of K SRs with K0 low priority SRs and K1=K−K0 high priority SRs that overlap with the determined PUCCH resource for joint HARQ-ACK with different priorities and SR reporting.

If a UE would transmit a PUCCH with $O_{ACK\_1}$ HARQ-ACK information bits with priority index 1 in a PUCCH resource for joint reporting of HARQ-ACK information with different priorities in a slot, $\lceil \log_2(K1+1) \rceil$ bits representing a negative or positive SR with priority index 1, in ascending order of the values of schedulingRequestResourceId and schedulingRequestIDForBFR, are appended to the HARQ-ACK information bits with priority index 1. If one of the SRs with low priority is a positive LRR, the value of the $\log_2(K1+1)$ bits indicates the positive LRR. An all-zero value for the $\log_2(K1+1)$ bits represents a negative SR value across K0 SRs with priority index 0. The UE generates a combined $O_{UCI\_1}=O_{ACK\_1}+\log_2(K1+1)$ UCI bits for the HARQ-ACK and SR with priority index 1.

If a UE would transmit a PUCCH with $O_{ACK\_0}$ HARQ-ACK information bits with priority index 0 in a PUCCH resource for joint reporting of HARQ-ACK information with different priorities in a slot, $\lceil \log_2(K0+1) \rceil$ bits representing a negative or positive SR with priority index 0, in ascending order of the values of schedulingRequestResourceId and schedulingRequestIDForBFR, are appended to the HARQ-ACK information bits with priority index 0. If one of the SRs with low priority is a positive LRR, the value of the $\lceil \log_2(K0+1) \rceil$ bits indicates the positive LRR. An all-zero value for the $\lceil \log_2(K0+1) \rceil$ bits represents a negative SR value across K0 SRs with priority index 0. The UE generates a combined $O_{UCI\_0}=O_{ACK\_0}+\lceil \log_2(K0+1) \rceil$ UCI bits for the HARQ-ACK and SR with priority index 0.

The UE may report the combined $O_{UCI\_1}$ and $O_{UCI\_0}$ in a PUCCH using a resource with PUCCH format 2 or PUCCH format 3 or PUCCH format 4 that the UE determines based on UCI payload of HARQ-ACK with or without SR for both high priority and low priority.

If joint coding is used for UCI multiplexing with different priorities, the UE transmits $O_{UCI}=O_{UCI\_1}+O_{UCI\_0}=O_{ACK\_1}+\lceil \log_2(K1+1) \rceil+O_{ACK\_0}+\lceil \log_2(K+1) \rceil$ UCI bits in a PUCCH using a resource with PUCCH format 2 or PUCCH format 3 or PUCCH format 4 that the UE determines based on total UCI payload $O_{UCI}$ of HARQ-ACK with or without SR for both high priority and low priority.

If separate coding is applied for UCI multiplexing with different priorities, the $O_{UCI\_1}$ and $O_{UCI\_0}$ UCI bits are separate encoded and rate matched with different maximum code rate on the PUCCH. The PUCCH resource is determined jointly based on the payload sizes and maximum code rate of different priorities.

It should be noted that if the total payload of HARQ-ACK with the generated SR bits cannot be reported with the determined PUCCH resource, the UE may re-select a PUCCH resource with PUCCH format 2/3/4 based on the HARQ-ACK with SR payloads of both high priority and low priority. Then the SR overlapping conditions should be re-evaluated to determine the number of SR bits for each priority based on the newly selected PUCCH resource, i.e. repeat step 3-4.

The determined PUCCH for HARQ-ACK multiplexing with or without SR may be a configured high priority PUCCH resource for HARQ-ACK with high priority, i.e, with priority index 1. The determined PUCCH for HARQ-ACK multiplexing with or without SR may be selected from a separately configured PUCCH resource sets for UCI multiplexing.

With both approaches, the UE may report SR with high priority and SR with low priority in separate bits. Thus, the SR status of each priority can be reported independently. In one case, a UE may report a positive SR with high priority and a positive SR with low priority simultaneously. In another case, a UE may report only one positive SR among all SR configurations. If both a high priority SR and a positive low priority SR are triggered, only the positive high priority SR is reported as positive, and the positive low priority SR is reported as negative.

In a second approach (Approach 2), only high priority SR is reported. In this approach, in case of SR joint reporting with HARQ-ACK with priority index 1 and HARQ-ACK with priority index 0, the low priority SR is ignored, only high priority SR can be reported. Thus, a number of bits for SR with high priority is generated and appended to the HARQ-ACK with priority index 1 first, then appended by low priority HARQ-ACK. Thus, the UCI ordering is given by HP HARQ-ACK+HP SR+LP HARQ-ACK.

This approach drops the low priority SR and reduces the total payload for the joint reporting. However, if there is a positive SR with low priority triggered, the positive SR with low priority is not reported even if there is a negative SR with high priority or no SR with high priority.

In one approach (Approach 2-a), the bits representing SR with priority index 1 is generated based on the SR PUCCH overlapping conditions with the original HARQ-ACK PUCCH resource with priority index 1. In some examples, a UE may be configured to transmit K1 PUCCHs for respective K1 SRs in a slot, as determined by a set of schedulingRequestResourceId and schedulingRequestID-ForBFR, with SR transmission occasions that would overlap with a transmission of a PUCCH with HARQ-ACK information with priority index 1 from the UE in the slot. If a UE would transmit a PUCCH with $O_{ACK\_1}$ HARQ-ACK information bits with priority index 1 in a resource in a slot, $\lceil \log_2(K1+1) \rceil$ bits representing a negative or positive SR with priority index 1, in ascending order of the values of schedulingRequestResourceId and schedulingRequestID-ForBFR, are appended to the HARQ-ACK information bits with priority index 1. If one of the SRs with low priority is a positive LRR, the value of the $\lceil \log_2(K1+1) \rceil$ bits indicates the positive LRR. An all-zero value for the $\lceil \log_2(K1+1) \rceil$ bits represents a negative SR value across K0 SRs with priority index 0. The UE generates a combined $O_{UCI\_1}=O_{ACK\_1}+\lceil\log_2(K1+1)\rceil$ UCI bits for the HARQ-ACK and SR with priority index 1.

In some examples, a UE may be configured to transmit K0 PUCCHs for respective K0 SRs in a slot, as determined by a set of schedulingRequestResourceId and schedulingRequestIDForBFR, with SR transmission occasions that would overlap with a transmission of a PUCCH with HARQ-ACK Information with priority index 0 from the UE in the slot. If a UE would transmit a PUCCH with $O_{ACK\_0}$ HARQ-ACK information bits with priority index 0 in a resource in a slot, no bit representing a negative or positive SR with priority index 0, is appended to the HARQ-ACK information bits with priority index 0. The UE generates a $O_{UCI\_0}=O_{ACK\_0}$ UCI bits for the HARQ-ACK and SR with priority index 0.

The UE reports the combined $O_{UCI\_1}$ and $O_{UCI\_0}$ in a PUCCH using a resource with PUCCH format 2 or PUCCH format 3 or PUCCH format 4 that the UE determines based on UCI payload of HARQ-ACK with or without SR for both high priority and low priority.

If joint coding is used for UCI multiplexing with different priorities, the UE transmits $O_{UCI}=O_{UCI\_1}+O_{UCI\_0}=O_{ACK\_1}+\lceil\log_2(K1+1)\rceil+O_{ACK\_0}$ UCI bits in a PUCCH using a resource with PUCCH format 2 or PUCCH format 3 or PUCCH format 4 that the UE determines based on total UCI payload $O_{UCI}$ of HARQ-ACK with or without SR for both high priority and low priority.

If separate coding is applied for UCI multiplexing with different priorities, the $O_{UCI\_1}$ and $O_{UCI\_0}$ UCI bits are separate encoded and rate matched with different maximum code rate on the PUCCH. The PUCCH resource is determined jointly based on the payload sizes and maximum code rate of different priorities.

In another approach (Approach 2-b), the bits representing SR with priority index 1 is generated based on the SR PUCCH overlapping conditions with a determined PUCCH resource for the joint reporting of HARQ-ACK with or without SR and with HARQ-ACK of different priorities. In this approach, the UE should perform the SR bits determination in several steps. In a first step (step 1), the UE may determine the HARQ-ACK codebooks of high priority and low priority. In a second step (step 2), the UE may determine a PUCCH resource with PUCCH format 2/3/4 based on the HARQ-ACK payloads of both high priority and low priority. In a third step (step 3), the UE may determine the high priority SR PUCCH resource overlapping conditions with the determined PUCCH resource. In a fourth step (step 4), the UE may determine the number of SR bits to be appended to the HARQ-ACK with priority index 1 based on the overlapping conditions.

Considering SR with different priorities, a UE is configured to transmit K PUCCHs for respective K SRs in a slot, as determined by a set of schedulingRequestResourceId and schedulingRequestIDForBFR, with SR transmission occasions that would overlap with a transmission of a PUCCH for joint reporting of HARQ-ACK information with different priorities from the UE in the slot. Among the K overlapping SRs in a slot, there are K0 SRs with priority index 0 and K1 SRs with priority index 1, where K0≥2:0, K1≥2:0, and K0+K1=K. That is, there are a total of K SRs with K0 low priority SRs and K1=K−K0 high priority SRs that overlap with the determined PUCCH resource for joint HARQ-ACK with different priorities and SR reporting.

If a UE would transmit a PUCCH with $O_{ACK\_1}$ HARQ-ACK information bits with priority index 1 in a resource in a slot, $\lceil\log_2(K1+1)\rceil$ bits representing a negative or positive SR with priority index 1, in ascending order of the values of schedulingRequestResourceId and schedulingRequestID-ForBFR, are appended to the HARQ-ACK information bits with priority index 1. If one of the SRs with low priority is a positive LRR, the value of the $\lceil\log_2(K1+1)\rceil$ bits indicates the positive LRR. An all-zero value for the $\lceil\log_2(K1+1)\rceil$ bits represents a negative SR value across K0 SRs with priority index 0. The UE generates a combined $O_{UCI\_1}=O_{ACK\_1}+\lceil\log_2(K1+1)\rceil$ UCI bits for the HARQ-ACK and SR with priority index 1.

If a UE would transmit a PUCCH with $O_{ACK\_0}$ HARQ-ACK information bits with priority index 0 in a resource in a slot, no bit representing a negative or positive SR with priority index 0, is appended to the HARQ-ACK information bits with priority index 0. The UE generates a combined $O_{UCI\_0}=O_{ACK\_0}$ UCI bits for the HARQ-ACK and SR with priority index 0.

The UE may report the combined $O_{UCI\_1}$ and $O_{UCI\_0}$ in a PUCCH using a resource with PUCCH format 2 or PUCCH format 3 or PUCCH format 4 that the UE determines based on UCI payload of HARQ-ACK with or without SR for both high priority and low priority. If joint coding is used for UCI multiplexing with different priorities, the UE may transmit $O_{UCI}=O_{UCI\_1}+O_{UCI\_0}=O_{ACK\_1}+\lceil\log_2(K+1)\rceil+O_{ACK\_0}$ UCI bits in a PUCCH using a resource with PUCCH format 2 or PUCCH format 3 or PUCCH format 4 that the UE determines based on total UCI payload $O_{UCI}$ of HARQ-ACK with or without SR for both high priority and low priority.

If separate coding is applied for UCI multiplexing with different priorities, the $O_{UCI\_1}$ and $O_{UCI\_0}$ UCI bits are separate encoded and rate matched with different maximum code rate on the PUCCH. The PUCCH resource is determined jointly based on the payload sizes and maximum code rate of different priorities.

It should be noted that if the total payload of HARQ-ACK with the generated SR bits cannot be reported with the determined PUCCH resource, the UE may re-select a PUCCH resource with PUCCH format 2/3/4 based on the HARQ-ACK with SR payloads of both high priority and low priority. Then the SR overlapping conditions should be re-evaluated to determine the number of SR bits for each priority based on the newly selected PUCCH resource, i.e. repeat step 3-4.

The determined PUCCH for HARQ-ACK multiplexing with or without SR may be a configured high priority PUCCH resource for HARQ-ACK with high priority, i.e, with priority index 1. The determined PUCCH for HARQ-ACK multiplexing with or without SR may be selected from a separately configured PUCCH resource sets for UCI multiplexing.

Whether Approach 1 or Approach 2 is used may be determined by whether low priority SR reporting with high priority HARQ-ACK and low priority HARQ-ACK is supported. The support of low priority SR reporting with high priority HARQ-ACK and low priority HARQ-ACK may be fixed in the specification, or may be configured by higher layer signaling.

If low priority SR reporting with high priority HARQ-ACK and low priority HARQ-ACK is supported, the low priority SR bits should be generated, and Approach 1 should be used to report joint HARQ-ACK with or without SR.

If low priority SR reporting with high priority HARQ-ACK and low priority HARQ-ACK is not supported, the low priority SR bits should not be generated or the generated low priority SR bits should be dropped, and Approach 2 should be used to report joint HARQ-ACK with or without SR.

If there is no overlapping low priority SR PUCCH with the HARQ-ACK PUCCH resource, the approaches 1-2 above will lead to the same HARQ-ACK and SR multiplexing results.

In a fourth method (Method 4), HARQ-ACK of different priorities are multiplexed first, then appended with bits for SR. It should be noted that in current NR, the UCI collision and multiplexing are performed within the same priority first. The resulting two PUCCHs with different priorities will be handled at last. With Method 4, the existing UCI multiplexing order will be changed.

With Method 4, the HARQ-ACK bits are multiplexed first, then the SR bits are appended to the joint HARQ-ACK codebook. Thus, the UCI multiplexing order is performed by UCI type instead of priority index, and the UCI ordering is given by HP HARQ-ACK+LP HARQ-ACK+SR.

The logic of this method is to promote the low priority HARQ-ACK to the same level as high priority HARQ-ACK in the case of HARQ-ACK multiplexing. The bits representing SR is then evaluated and appended to the combined HARQ-ACK codebook.

Because the HARQ-ACK of different priorities are treated as one HARQ-ACK codebook, the PUCCH resource for the joint reporting should be determined, and the bit for SR should be generated based on the SR overlapping conditions with the determined PUCCH resource for joint HARQ-ACK reporting.

Method 4 can potentially result in smaller payload size for SR, thus smaller total payload on the PUCCH transmission. Furthermore, the bits for SR bits generation may be simpler and no need to differentiate different PUCCH formats for each HARQ-ACK codebook. Since the SR resources may be configured with priority index 1 or priority index 0, more details need to be specified on how to report the SR bits with the joint HARQ-ACK codebook.

In the following, considering SR with different priorities, a UE may be configured to transmit K PUCCHs for respective K SRs in a slot, as determined by a set of schedulingRequestResourceId and schedulingRequestIDForBFR, with SR transmission occasions that would overlap with a transmission of a PUCCH for joint reporting of HARQ-ACK information with different priorities from the UE in the slot. Among the K overlapping SRs in a slot, there are K0 SRs with priority index 0 and K1 SRs with priority index 1, where K0≥2:0, K1≥0, and K0+K1=K. That is, there are a total of K SRs with K0 low priority SRs and K1=K−K0 high priority SRs that overlap with the determined PUCCH resource for joint HARQ-ACK with different priorities and SR reporting.

Several approaches can be considered under Method 4. In a first approach (Approach 1), bits may be appended to HARQ-ACK by counting SR with all priorities together based on SR indexes. In this approach, both low priority SR and high priority SR may be reported, all overlapping SR PUCCH configurations are counted together. The UCI ordering is given by HP HARQ-ACK+LP HARQ-ACK+SR, where the SR bits is generated for all SR with RRC index ordering, and the number of SR bits appended to the HARQ-ACK bits is $\lceil \log_2(K+1) \rceil$.

If a UE would transmit a PUCCH with $O_{ACK\_1}$ HARQ-ACK information bits with priority index 1 and $O_{ACK\_0}$ HARQ-ACK information bits with priority index 0 in a resource using PUCCH format 2 or PUCCH format 3 or PUCCH format 4 in a slot, $\lceil \log_2(K+1) \rceil$ bits representing a negative or positive SR, in ascending order of the values of schedulingRequestResourceId and schedulingRequestID-ForBFR, are appended to the HARQ-ACK information bits and the UE transmits the combined UCI bits in a PUCCH using a resource with PUCCH format 2 or PUCCH format 3 or PUCCH format 4 that the UE determines based on UCI payload of HARQ-ACK with or without SR for both high priority and low priority. If one of the SRs is a positive LRR, the value of the $\lceil \log_2(K+1) \rceil$ bits indicates the positive LRR. An all-zero value for the $\lceil \log_2(K+1) \rceil$ bits represents a negative SR value across all K SRs.

With this approach, the SR bit ordering is based on the overlapping SR indexes, so the SRs with different priorities may be mixed together based on the SR index ordering. Only one positive SR can be indicated by the appended bits. Thus, if there are positive LLRs with both SR priority 1 and SR priority index 0, the value of the $\lceil \log_2(K+1) \rceil$ bits indicates a positive LRR with SR priority 1.

This approach may use the minimum number of bits to indicate all K overlapping SRs with different priorities with the joint HARQ-ACK reporting PUCCH resource. With Approach 1, if joint coding is used for UCI multiplexing with different priorities, the UE transmits $O_{UCI}=O_{ACK\_1}+O_{ACK\_0}+\lceil \log_2(K+1) \rceil$ UCI bits in a PUCCH using a resource with PUCCH format 2 or PUCCH format 3 or PUCCH format 4 that the UE determines based on total UCI payload $O_{UCI}$ of HARQ-ACK with or without SR for both high priority and low priority.

If separate coding is used for UCI multiplexing with different priorities, the SR bits may be joint coded with the low priority HARQ-ACK. Thus, with separate coding, the $O_{UCI\_1}=O_{ACK\_1}$ and $O_{UCI\_0}=O_{ACK\_0}+\lceil \log_2(K+1) \rceil$ UCI bits are separate encoded and rate matched with different maximum code rate on the PUCCH. The PUCCH resource is determined jointly based on the payload sizes and maximum code rate of different priorities. Since there is no differentiation of SR bits for high priority and SR bits for low priority, the error probability for the high priority SR may not be guaranteed.

In a second approach (Approach 2), bits may be appended to HARQ-ACK by counting SRs separately based on SR indexes with each priority. In this approach, all overlapping SRs can be counted, but the SRs with priority index 1 and priority index 0 are counted separately to generate separate SR bits for different priorities. And the UCI ordering is given by HP HARQ-ACK+LP HARQ-ACK+HP SR+LP SR.

Thus, $\lceil \log_2(K1+1) \rceil$ bits representing a negative or positive SR with priority index 1, and $\lceil \log_2(K0+1) \rceil$ bits representing a negative or positive SR with priority index 0, where K1+K0=K. Thus, the total number of bits representing SRs appended to the HARQ-ACK bits is $\lceil \log_2(K1+1) \rceil+\lceil \log_2(K0+1) \rceil$. The bits representing high priority SRs are appended to the joint HARQ-ACK bits first, followed by the bits representing low priority SRs.

If a UE would transmit a PUCCH with $O_{ACK\_1}$ HARQ-ACK information bits with priority index 1 and $O_{ACK\_0}$ HARQ-ACK information bits with priority index 0 in a resource using PUCCH format 2 or PUCCH format 3 or PUCCH format 4 in a slot, $\lceil \log_2(K1+1) \rceil$ bits representing a negative or positive SR with priority index 1, in ascending order of the values of schedulingRequestResourceId and schedulingRequestIDForBFR, and $\lceil \log_2(K0+1) \rceil$ bits representing a negative or positive SR with priority index 0, in ascending order of the values of schedulingRequestResourceId and schedulingRequestIDForBFR, are appended to the HARQ-ACK information bits and the UE transmits the combined UCI bits in a PUCCH using a resource with PUCCH format 2 or PUCCH format 3 or PUCCH format 4 that the UE determines based on UCI payload of HARQ-ACK with or without SR for both high priority and low priority.

If one of the SRs with priority index 1 is a positive LRR, the value of the $\lceil \log_2(K1+1) \rceil$ bits indicates the positive LRR within the SRs with priority index 1. An all-zero value for the $\lceil \log_2(K1+1) \rceil$ bits represents a negative SR value across all K1 SRs with priority index 1. If one of the SRs with priority index 0 is a positive LRR, the value of the $\lceil \log_2(K0+1) \rceil$ bits indicates the positive LRR within the SRs with priority index 0. An all-zero value for the $\lceil \log_2(K0+1) \rceil$ bits represents a negative SR value across all K0 SRs with priority index 0.

With this approach, the UE may report SR with high priority and SR with low priority in separate bits. Thus, the SR status of each priority can be reported independently. In one case, a UE may report a positive SR with high priority and a positive SR with low priority simultaneously. Thus, if there are positive LLRs with both SR priority 1 and SR priority index 0, two positive SRs can be indicated independently and simultaneously within the corresponding bits representing the SR of the given priority. In another case, a UE may report only one positive SR among all SR configurations. If both a high priority SR and a positive low priority SR are triggered, only the positive high priority SR is reported as positive, and the positive low priority SR is reported as negative.

This approach may require more bits to indicate K overlapping SRs with different priorities with the HARQ-ACK PUCCH resource, i.e. a total of $\lceil \log_2(K1+1) \rceil + \lceil \log_2(K0+1) \rceil$ bits are added to the HARQ-ACK compared with $\lceil \log_2(K+1) \rceil$ bit in approach 1.

With Approach 2, if joint coding of HARQ-ACK with different priorities is used for UCI multiplexing with different priorities, the UE transmits $O_{UCI} = O_{ACK\_1} + O_{ACK\_0} + \lceil \log_2(K1+1) \rceil + \lceil \log_2(K0+1) \rceil$ UCI bits in a PUCCH using a resource with PUCCH format 2 or PUCCH format 3 or PUCCH format 4 that the UE determines based on total UCI payload $O_{UCI}$ of HARQ-ACK with or without SR for both high priority and low priority.

If separate coding is used for UCI multiplexing with different priorities, the SR bits may be joint coded with the low priority HARQ-ACK. Thus, with separate coding, the $O_{UCI\_1} = O_{ACK\_1}$ and $O_{UCI\_0} = O_{ACK\_0} + \lceil \log_2(K1+1) \rceil + \lceil \log_2(K0+1) \rceil$ UCI bits are separate encoded and rate matched with different maximum code rate on the PUCCH. The PUCCH resource is determined jointly based on the payload sizes and maximum code rate of different priorities. Since there is no differentiation of SR bits for high priority and SR bits for low priority, the error probability for the high priority SR may not be guaranteed.

In a third approach (Approach 3), bit may be appended to HARQ-ACK by counting SRs with high priorities only. In this approach, because SR with priority index 1 is considered with higher priority than SR with priority index 0, the SRs with priority index 0 are dropped. The UCI ordering is given by: HP HARQ-ACK+LP HARQ-ACK+HP SR.

Therefore, if K1>0, the $\lceil \log_2(K1+1) \rceil$ bits representing a negative or positive SR with priority index 1 is multiplexed to the HARQ-ACK information bits. The $\lceil \log_2(K1+1) \rceil$ bits representing a negative or positive SR with priority index 1 is appended to the HARQ-ACK information bits. This maintains the order of HARQ-ACK information bits before SR bits.

If a UE would transmit a PUCCH with $O_{ACK\_1}$ HARQ-ACK information bits with priority index 1 and $O_{ACK\_0}$ HARQ-ACK information bits with priority index 0 in a resource using PUCCH format 2 or PUCCH format 3 or PUCCH format 4 in a slot, and $\lceil \log_2(K1+1) \rceil$ bits representing a negative or positive SR with priority index 1, in ascending order of the values of schedulingRequestResourceId and schedulingRequestIDForBFR, are appended to the HARQ-ACK information bits, and the UE transmits the combined UCI bits in a PUCCH using a resource with PUCCH format 2 or PUCCH format 3 or PUCCH format 4 that the UE determines based on UCI payload of HARQ-ACK with or without SR for both high priority and low priority. If one of the SRs with priority index 1 is a positive LRR, the value of the $\lceil \log_2(K1+1) \rceil$ bits indicates the positive LRR within the SRs with priority index 1. An all-zero value for the $\lceil \log_2(K1+1) \rceil$ bits represents a negative SR value across all K1 SRs with priority index 1.

Approach 3 reports only high priority SR if there are overlapping SR resources for both high priority SR and low priority SR. Thus, the SR with priority index 0 is disabled regardless the SR has a positive or negative state. However, if there is a positive low priority SR and negative high priority SR, the positive low priority SR cannot be reported. This may cause undesirable loss of low priority SR triggering.

With Approach 3, if joint coding of HARQ-ACK with different priorities is used for UCI multiplexing with different priorities, the UE transmits $O_{UCI} = O_{ACK\_1} + O_{ACK\_0} + \lceil \log_2(K1+1) \rceil$ UCI bits in a PUCCH using a resource with PUCCH format 2 or PUCCH format 3 or PUCCH format 4 that the UE determines based on total UCI payload $O_{UCI}$ of HARQ-ACK with or without SR for both high priority and low priority.

If separate coding is used for UCI multiplexing with different priorities, the SR bits may be joint coded with the low priority HARQ-ACK. Thus, with separate coding, the $O_{UCI\_1} = O_{ACK\_1}$ and $O_{UCI\_0} = O_{ACK\_0} + \lceil \log_2(K1+1) \rceil$ UCI bits are separate encoded and rate matched with different maximum code rate on the PUCCH. The PUCCH resource is determined jointly based on the payload sizes and maximum code rate of different priorities. Since there is no differentiation of SR bits for high priority and SR bits for low priority, the error probability for the high priority SR may not be guaranteed.

Alternatively, if separate coding is used for UCI multiplexing with different priorities, since SRs are high priority, the SR bits can be separately encoded from HARQ-ACK with the same maximum code rate configured for HARQ-ACK with priority index 1. Thus, high priority HARQ-ACK, low priority HARQ-ACK and high priority SR bits are separate encoded and rate matched with corresponding maximum code rate on the PUCCH.

The approach to be used may be determined by whether low priority SR reporting with high priority HARQ-ACK and low priority HARQ-ACK is supported. The support of low priority SR reporting with high priority HARQ-ACK and low priority HARQ-ACK may be fixed in the specification. The support of low priority SR reporting with high priority HARQ-ACK and low priority HARQ-ACK may be configured by higher layer signaling.

If low priority SR reporting with high priority HARQ-ACK and low priority HARQ-ACK is supported, the low priority SR bits should be generated, and Approach 1 or Approach 2 should be used to report joint HARQ-ACK with or without SR.

If low priority SR reporting with high priority HARQ-ACK and low priority HARQ-ACK is not supported, the low priority SR bits should not be generated or the generated low priority SR bits should be dropped, and Approach 3 should be used to report joint HARQ-ACK with or without SR.

If there is no overlapping low priority SR PUCCH with the HARQ-ACK PUCCH resource, the approaches 1-3 above will lead to the same HARQ-ACK and SR multiplexing results.

Selection between Method 3 and Method 4 is also described herein. Method 3 maintains the UCI multiplexing order, i.e. first between UCIs with the same priority. Method 3 can be used with either joint coding or separate coding for UCIs with different priorities. Method 4 modifies the UCI multiplexing order, i.e. first multiplex the same UCI type. Method 4 is may be more suitable for joint coding where all UCIs are encoded together.

For multiplexing of HARQ-ACK with priority index 1 and HARQ-ACK with priority index 0 and at least SR with priority index 1, several implementations can be used to determine which method is applied. In a first implementation (implementation 1), only one method (e.g., Method 3 or Method 4) is specified in the specification. In a second implementation (implementation 2), both Method 3 and Method 4 can be supported, and the method for SR multiplexing is configured by a parameter in higher layer signaling (e.g., RRC signaling). In a third implementation (implementation 3), both Method 3 and Method 4 can be supported, and the method for SR multiplexing is determined based on the coding method for UCI multiplexing with different priorities. In implementation 3, if separate coding is used for UCI multiplexing with different priorities, Method 3 is applied; if joint coding is used for UCI multiplexing with different priorities, Method 4 is applied.

The approach to be used with the applied method may be determined by whether low priority SR reporting with high priority HARQ-ACK and low priority HARQ-ACK is supported, as described above. If low priority SR reporting with high priority HARQ-ACK and low priority HARQ-ACK is supported, the low priority SR bits should be generated and reported jointly with HARQ-ACK with different priorities and high priority SR if present.

If low priority SR reporting with high priority HARQ-ACK and low priority HARQ-ACK is not supported, the low priority SR bits should not be generated or the generated low priority SR bits should be dropped, and the joint reporting contains high priority HARQ-ACK and low priority HARQ-ACK and high priority SR if present.

The UE operations module 124 may provide information 148 to the one or more receivers 120. For example, the UE operations module 124 may inform the receiver(s) when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162, and a gNB operations module 182. For example, one or more reception and/or transmission paths may be implemented in a gNB 160. For convenience, only a single transceiver 176, decoder 166, demodulator 172, encoder 109, and modulator 113 are illustrated in the gNB 160, though multiple parallel elements (e.g., transceivers 176, decoders 166, demodulators 172, encoders 109, and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
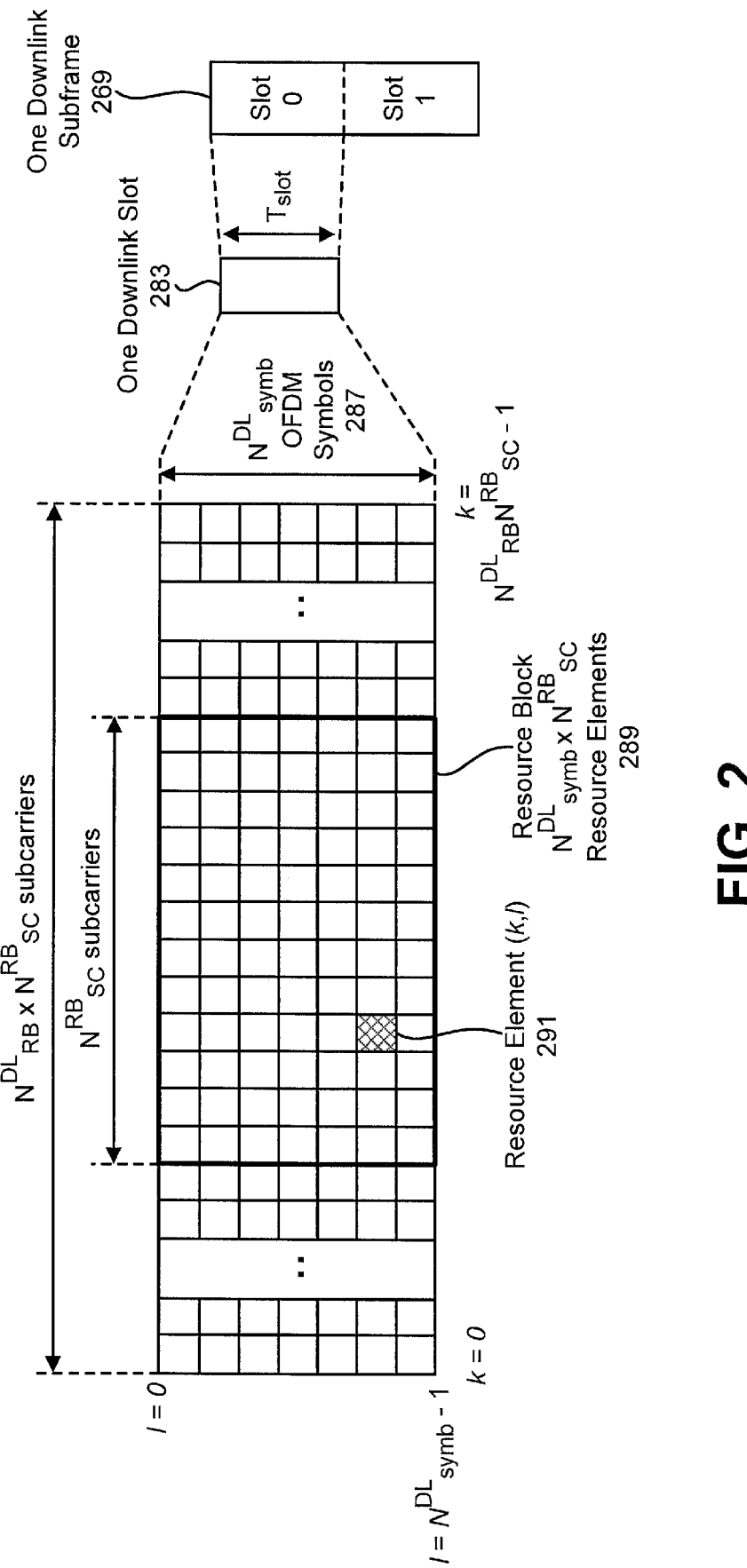
FIG. 2 is a diagram illustrating an example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For a SCell (including a Licensed Assisted Access (LAA) SCell), $N^{DL}_{RB}$ is configured by a RRC message dedicated to a UE 102. For PDSCH mapping, the available RE 291 may be the RE 291 whose index 1 fulfils $1 \geq l_{data,start}$ and/or $l_{data,start} \geq l$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
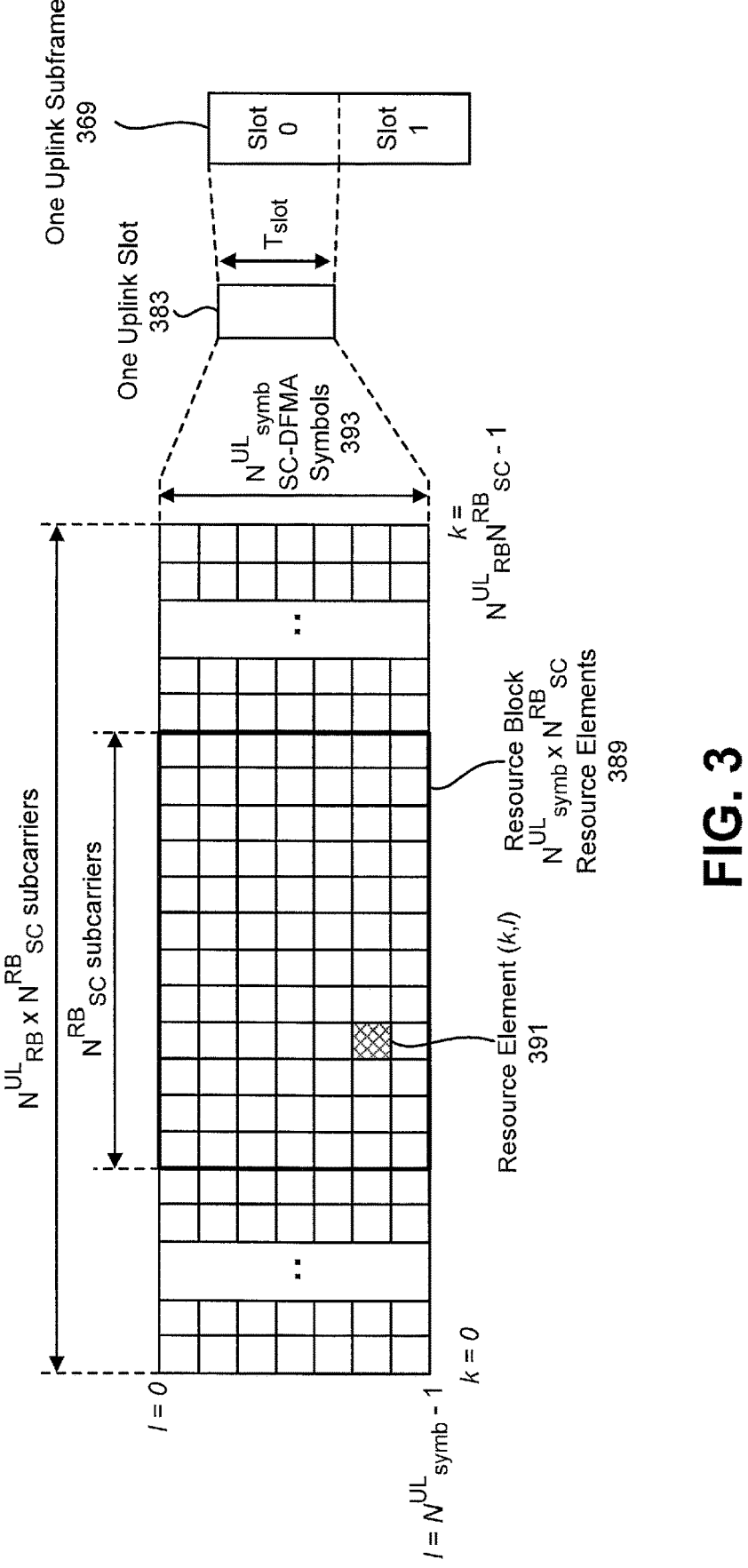
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For a SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM and/or DFT-S-OFDM symbols in time domain. A region defined by one sub-carrier in the frequency domain and one OFDM and/or DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 4:
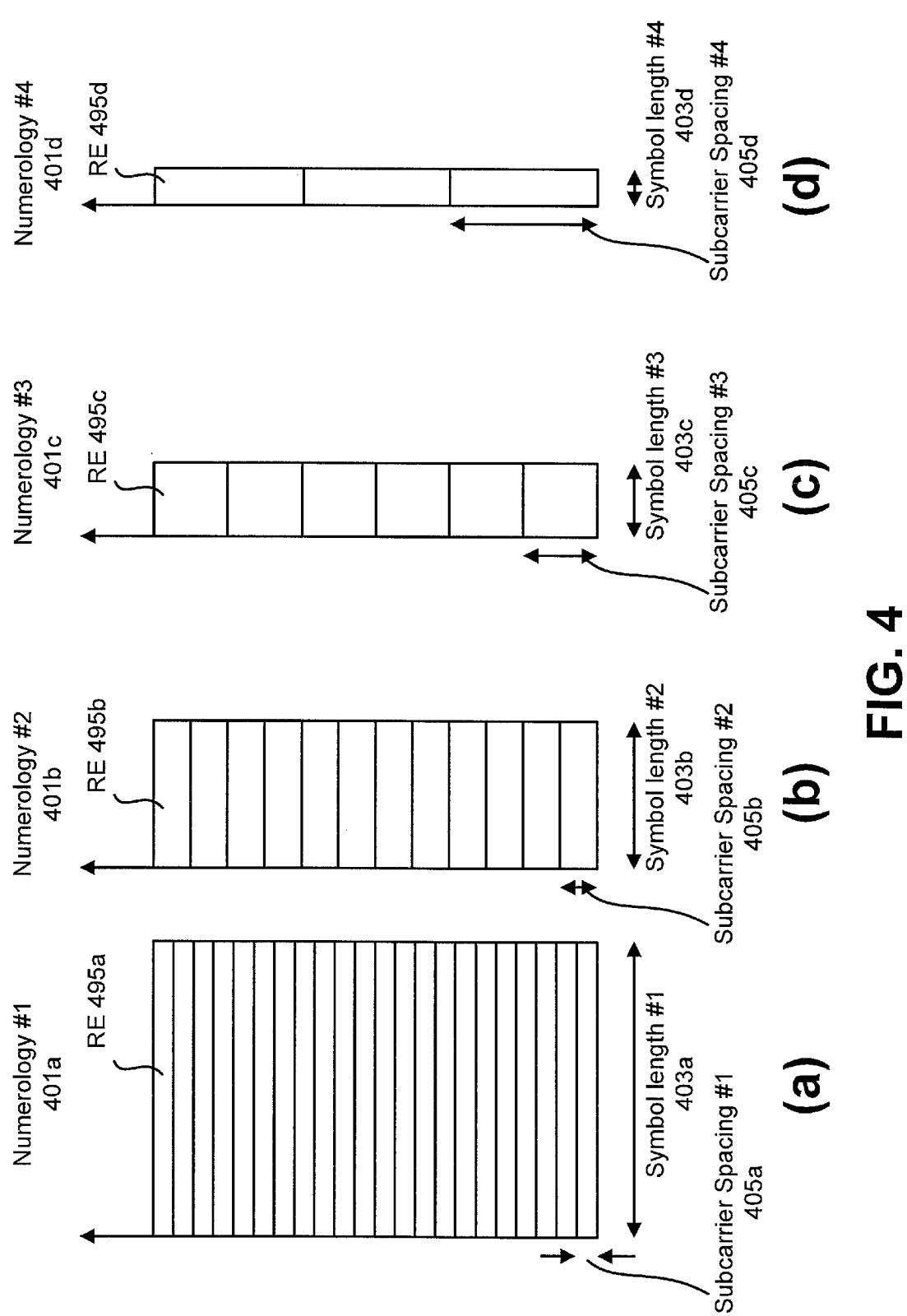
FIG. 4 shows examples of several numerologies.

FIG. 4 shows examples of several numerologies 401. The numerology #1 401a may be a basic numerology (e.g., a reference numerology). For example, a RE 495a of the basic numerology 401a may be defined with subcarrier spacing 405a of 15 kHz in frequency domain and 2048 Ts+CP length (e.g., 160 Ts or 144 Ts) in time domain (i.e., symbol length #1 403a), where Ts denotes a baseband sampling time unit defined as 1/(15000*2048) seconds. For the i-th numerology, the subcarrier spacing 405 may be equal to $15*2^i$ and the effective OFDM symbol length $2048*2^{-i}*$Ts. It may cause the symbol length is $2048*2^{-i}*$Ts+CP length (e.g., $160*2^{-i}*$Ts or $144*2^{-i}*$Ts). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). In some examples, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. In some examples, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. In some examples, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. For instance, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 5:
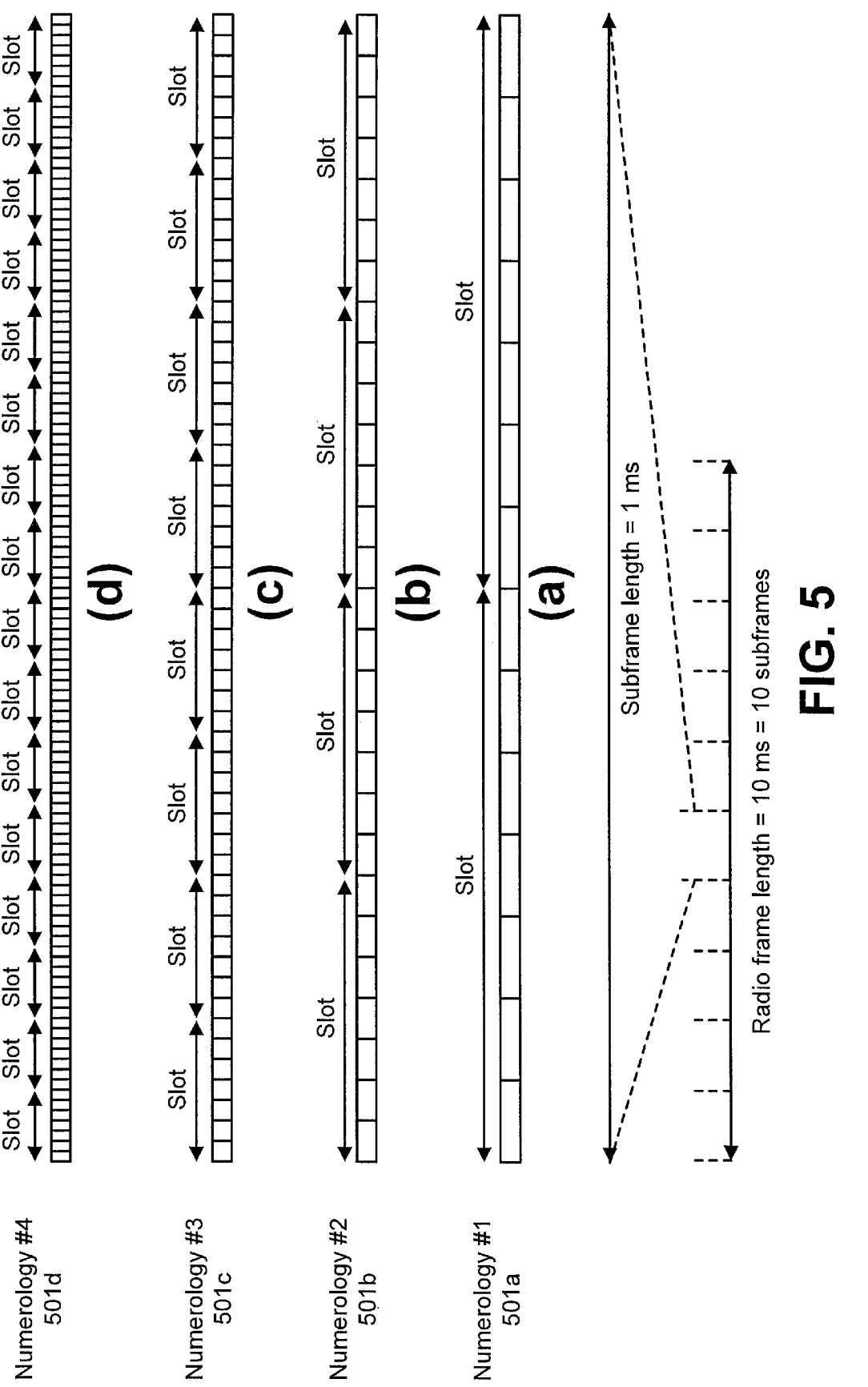
FIG. 5 shows examples of subframe structures for the numerologies that are shown in FIG. 4.

FIG. 5 shows examples of subframe structures for the numerologies 501 that are shown in FIG. 4. Given that a slot 283 includes $N^{DL}_{symb}$ (or $N^{UL}_{symb}$)=7 symbols, the slot length of the i+1-th numerology 501 is a half of the one for the i-th numerology 501, and eventually the number of slots 283 in a subframe (i.e., 1 ms) becomes double. It may be noted that a radio frame may include 10 subframes, and the radio frame length may be equal to 10 ms.

Figure 6:
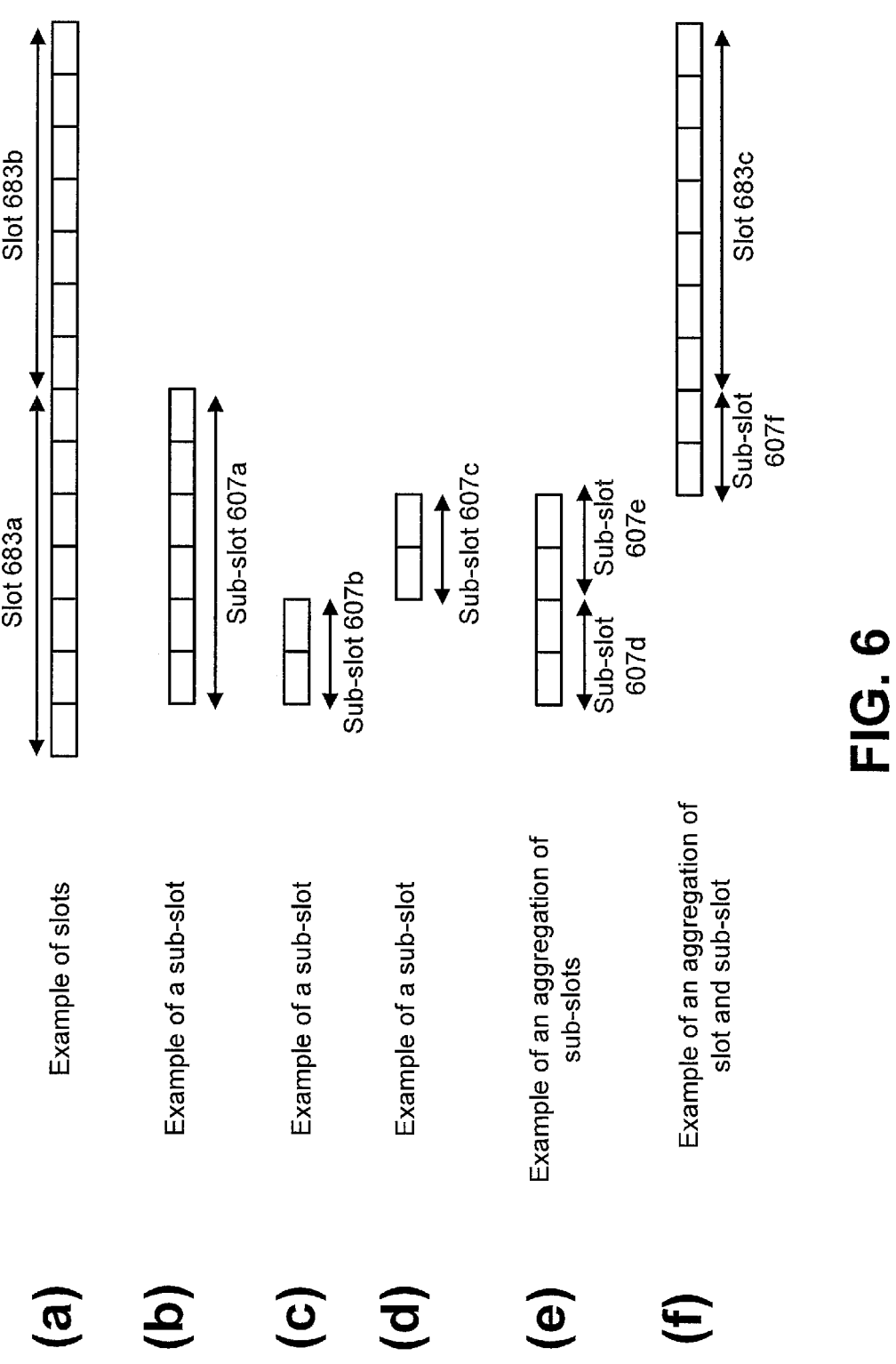
FIG. 6 shows examples of slots and sub-slots.

FIG. 6 shows examples of slots 683 and sub-slots 607. If a sub-slot 607 is not configured by higher layer, the UE 102 and the eNB and/or gNB 160 may only use a slot 683 as a scheduling unit. More specifically, a given transport block may be allocated to a slot 683. If the sub-slot 607 is configured by higher layer, the UE 102 and the eNB and/or gNB 160 may use the sub-slot 607 as well as the slot 683. The sub-slot 607 may include one or more OFDM symbols. The maximum number of OFDM symbols that constitute the sub-slot 607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 607 may start at any symbol within a slot 683 unless it collides with a control channel. There could be restrictions of mini-slot length based on restrictions on starting position. For example, the sub-slot 607 with the length of $N^{DL}_{symb}-1$ (or $N^{UL}_{symb}-1$) may start at the second symbol in a slot 683. The starting position of a sub-slot 607 may be indicated by a physical layer control channel (e.g., by DCI format). Alternatively, the starting position of a sub-slot 607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 607.

In cases when the sub-slot 607 is configured, a given transport block may be allocated to either a slot 683, a sub-slot 607, aggregated sub-slots 607 or aggregated sub-slot(s) 607 and slot 683. This unit may also be a unit for HARQ-ACK bit generation.

Figure 7:
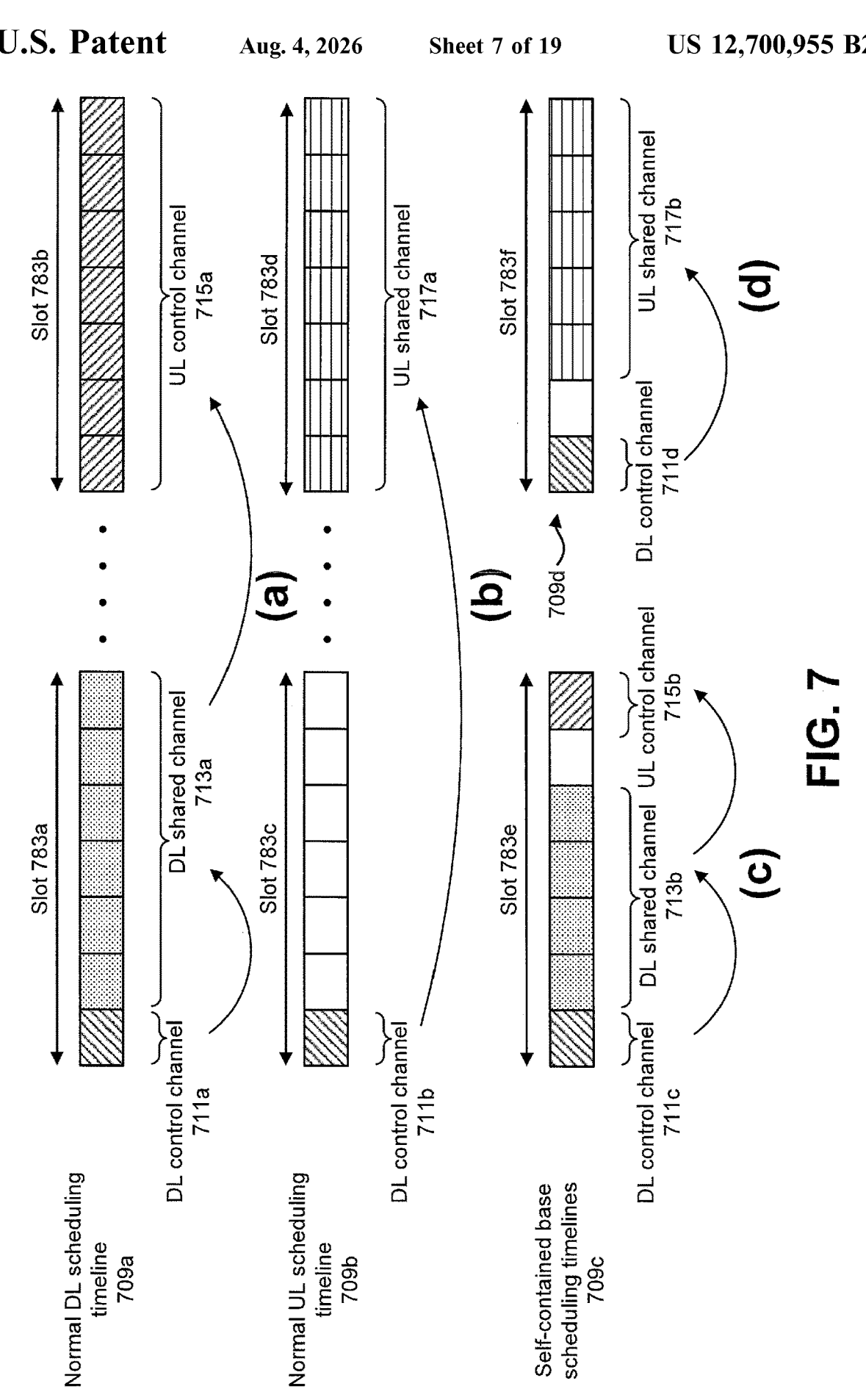
FIG. 7 shows examples of scheduling timelines.

FIG. 7 shows examples of scheduling timelines 709. For a normal DL scheduling timeline 709a, DL control channels are mapped the initial part of a slot 783a. The DL control channels 711 schedule DL shared channels 713a in the same slot 783a. HARQ-ACKs for the DL shared channels 713a (i.e., HARQ-ACKs each of which indicates whether or not transport block in each DL shared channel 713a is detected successfully) are reported via UL control channels 715a in a later slot 783b. In this instance, a given slot 783 may contain either one of DL transmission and UL transmission.

For a normal UL scheduling timeline 709b, DL control channels 711b are mapped the initial part of a slot 783c. The DL control channels 711b schedule UL shared channels 717a in a later slot 783d. For these cases, the association timing (time shift) between the DL slot 783c and the UL slot 783d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709c, DL control channels 711c are mapped to the initial part of a slot 783e. The DL control channels 711c schedule DL shared channels 713b in the same slot 783e. HARQ-ACKs for the DL shared channels 713b are reported in UL control channels 715b, which are mapped at the ending part of the slot 783e.

For a self-contained base UL scheduling timeline 709d, DL control channels 711d are mapped to the initial part of a slot 783f. The DL control channels 711d schedule UL shared channels 717b in the same slot 783f. For these cases, the slot 783f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 8:
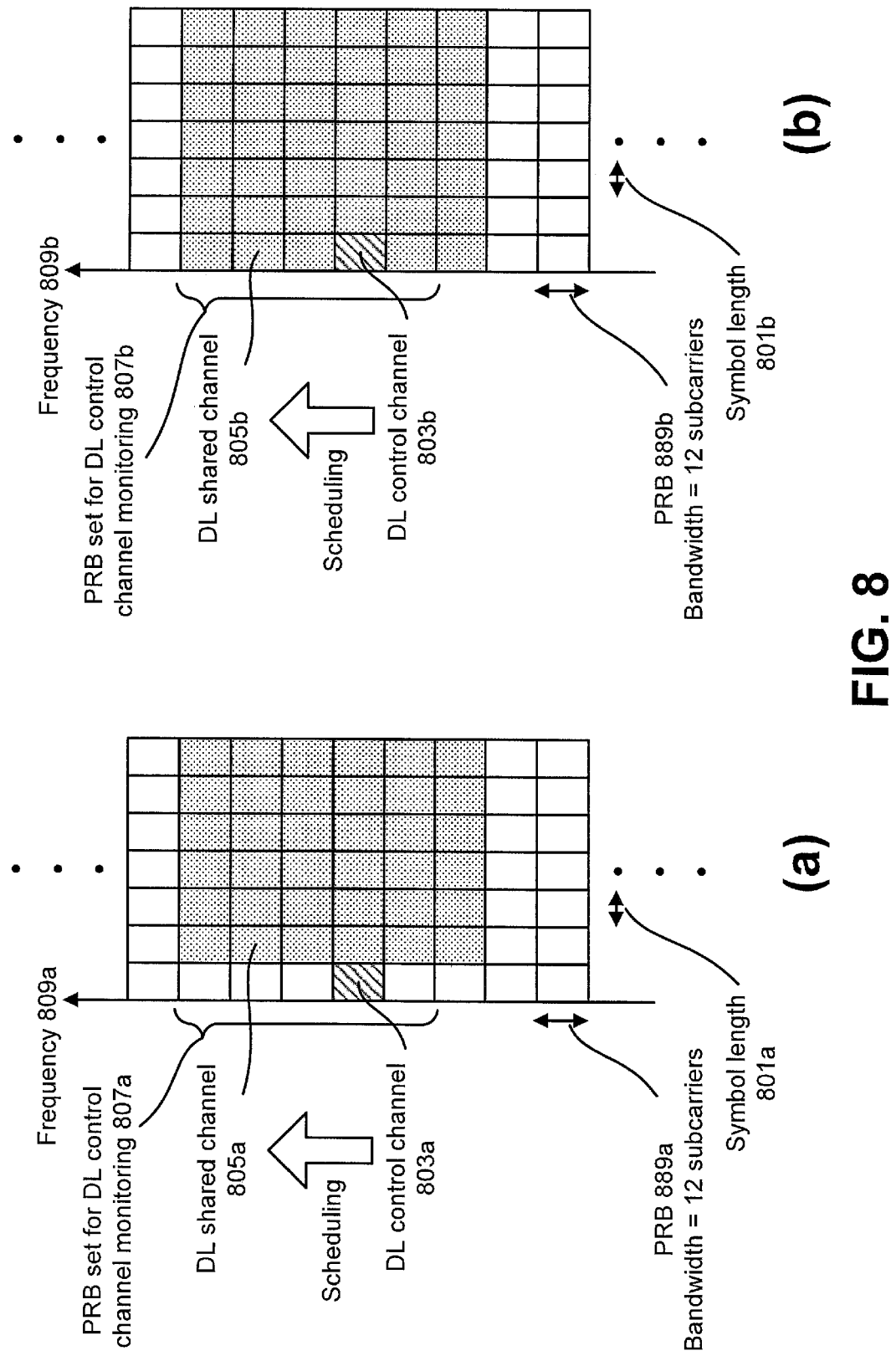
FIG. 8 shows examples of DL control channel monitoring regions.

FIG. 8 shows examples of DL control channel monitoring regions. One or more sets of PRB(s) may be configured for DL control channel monitoring. In other words, a control resource set is, in the frequency domain, a set of PRBs within which the UE attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include Demodulation reference signals (DMRS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 9:
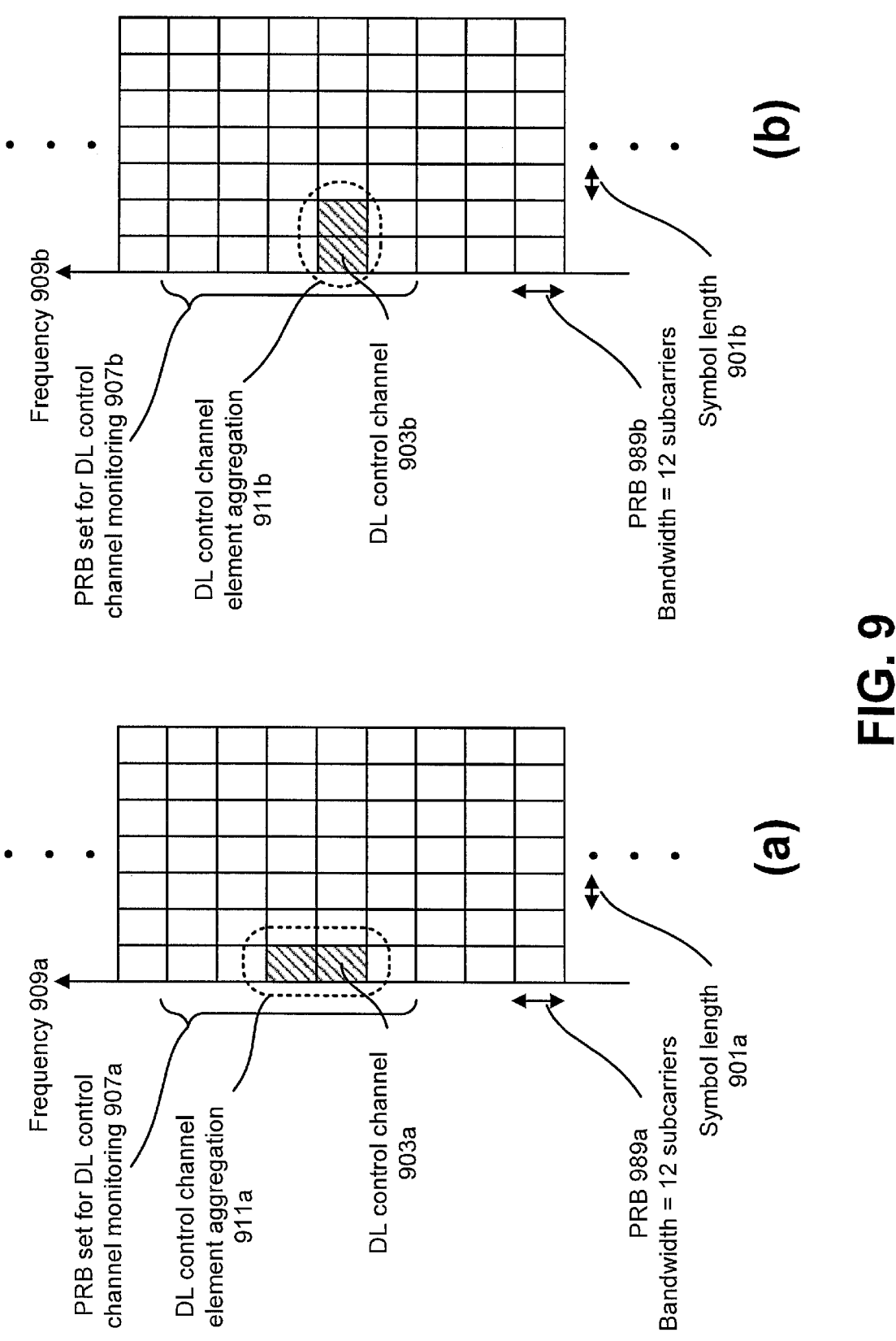
FIG. 9 shows examples of DL control channel which includes more than one control channel elements.

FIG. 9 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, for instance multiple DL control channel elements within an OFDM symbol are aggregated. Otherwise, DL control channel elements in different OFDM symbols can be aggregated.

Figure 10:
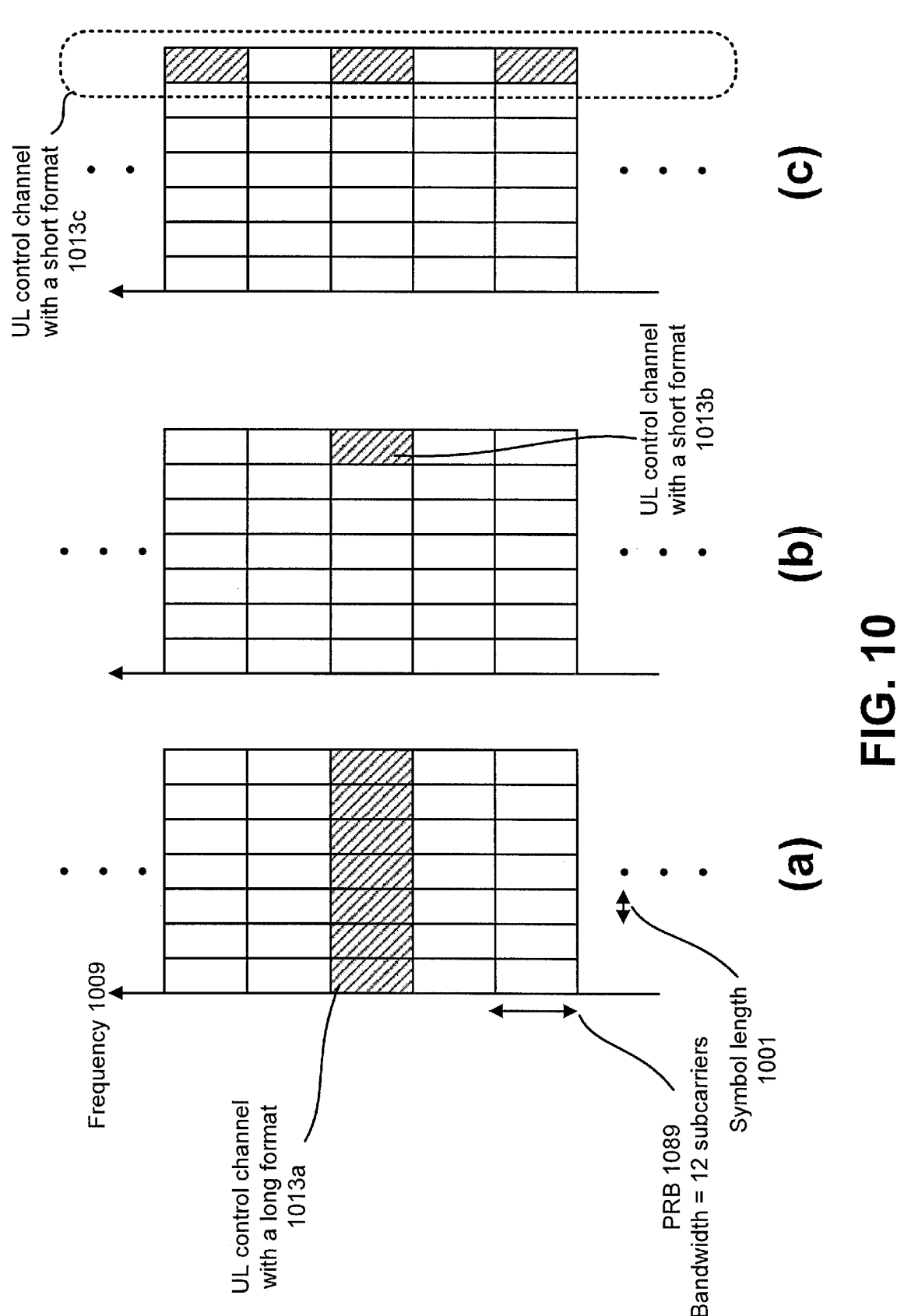
FIG. 10 shows examples of UL control channel structures.

FIG. 10 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, for instance the UL control channel may be mapped to every N PRBs (e.g., 5 or 10) within a system bandwidth.

Figure 11:
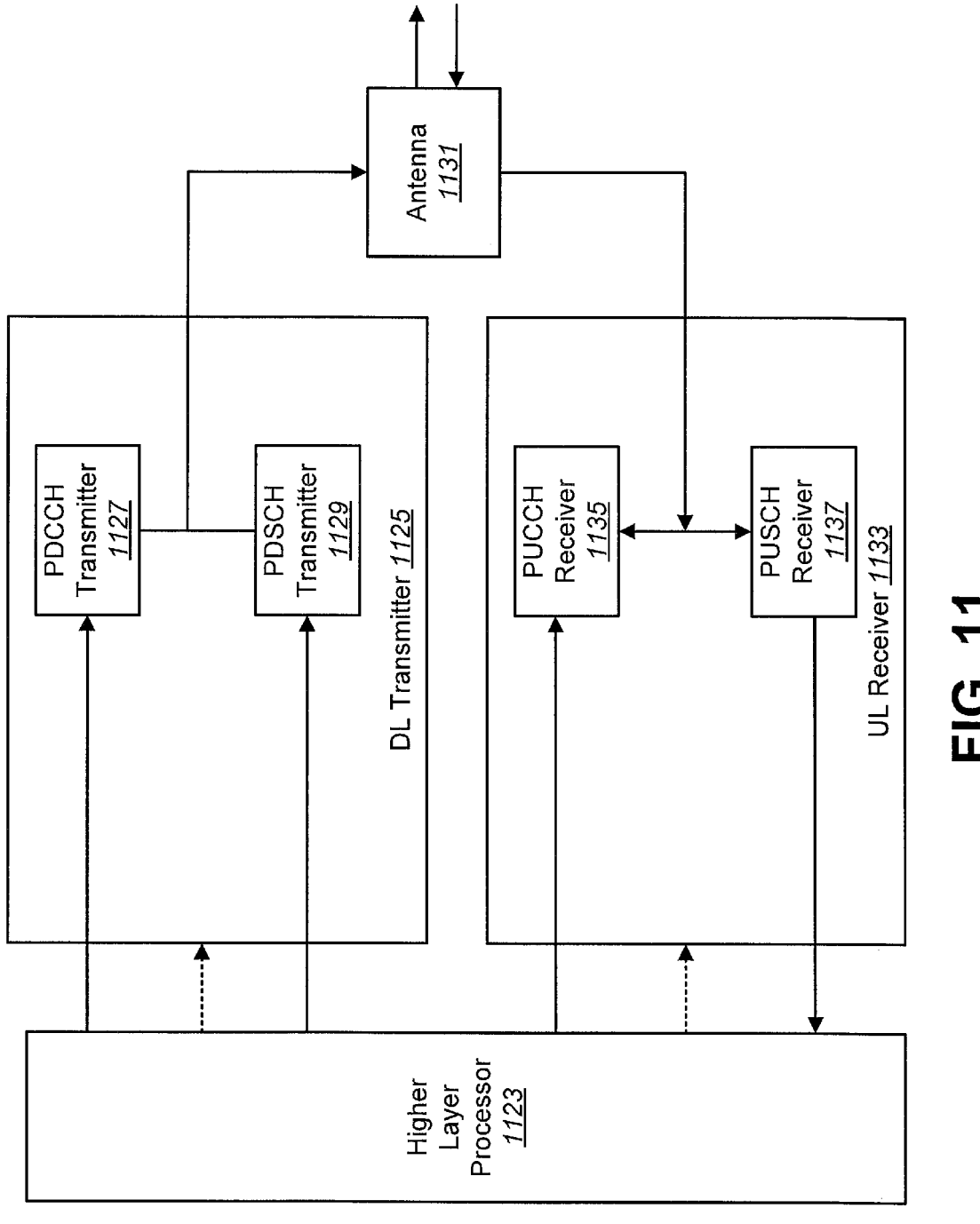
FIG. 11 is a block diagram illustrating one implementation of a gNB.

FIG. 11 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send and/or acquire higher layer messages such as an RRC message and MAC message to and/or from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
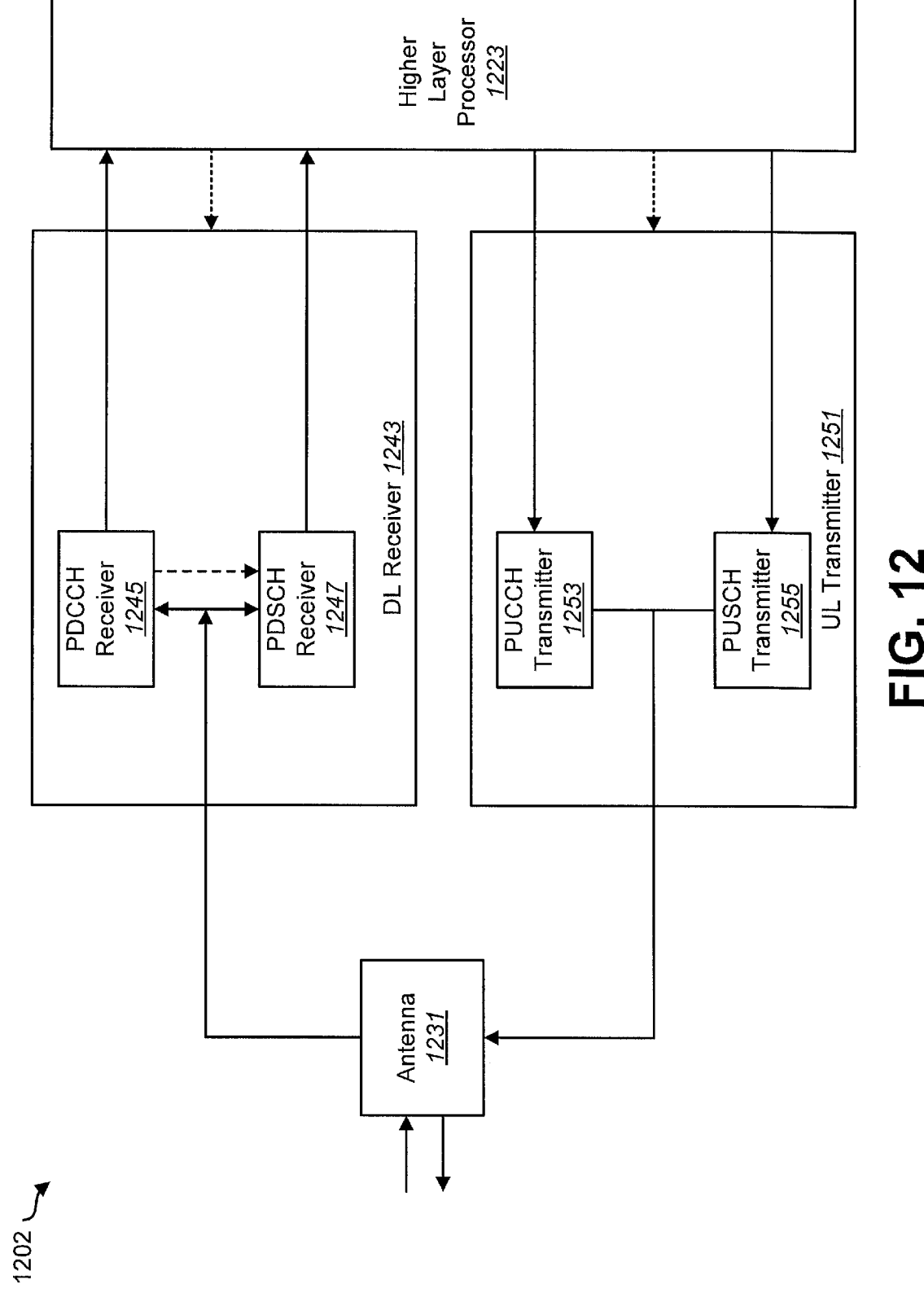
FIG. 12 is a block diagram illustrating one implementation of a UE.

FIG. 12 is a block diagram illustrating one implementation of a UE 1202. The UE may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send and/or acquire higher layer messages such as an RRC message and MAC message to and/or from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
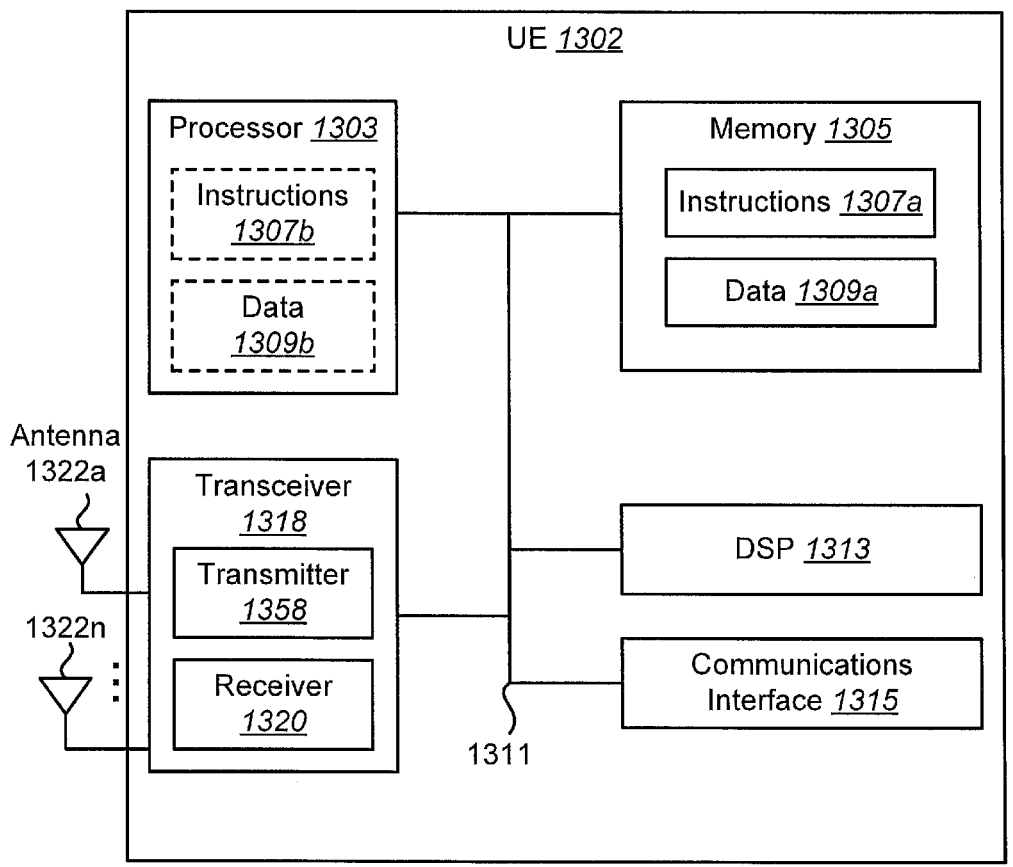
FIG. 13 illustrates various components that may be utilized in a UE.

FIG. 13 illustrates various components that may be utilized in a UE 1302. The UE described in connection with FIG. 13 may be implemented in accordance with the UE 102 described in connection with FIG. 1. The UE 1302 includes a processor that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random-access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement the methods described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
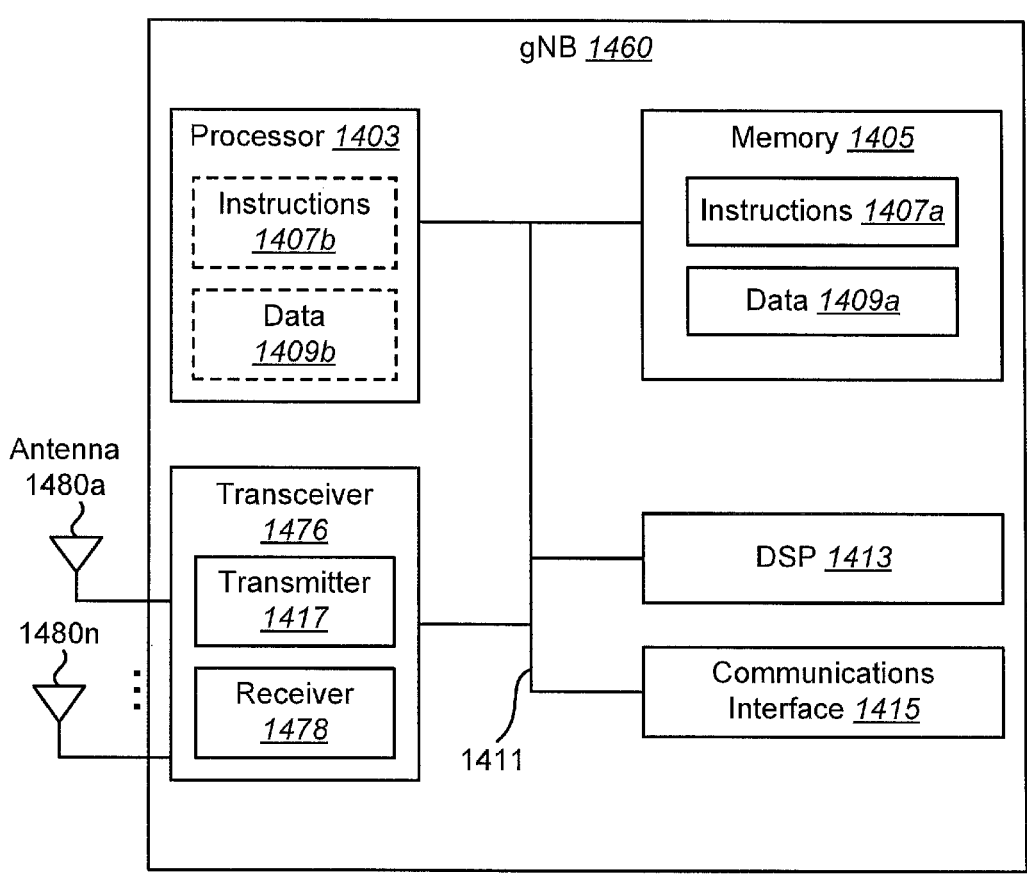
FIG. 14 illustrates various components that may be utilized in a gNB.

FIG. 14 illustrates various components that may be utilized in a gNB 1460. The gNB 1460 described in connection with FIG. 14 may be implemented in accordance with the gNB 160 described in connection with FIG. 1. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407a and data 1409a to the processor 1403. A portion of the memory 1405 may also include non-volatile random-access memory (NVRAM). Instructions 1407b and data 1409b may also reside in the processor 1403. Instructions 1407b and/or data 1409b loaded into the processor 1403 may also include instructions 1407a and/or data 1409a from memory that were loaded for execution or processing by the processor 1403. The instructions 1407b may be executed by the processor 1403 to implement the methods described above.

The gNB 1460 may also include a housing that contains one or more transmitters and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 14 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 14 is a functional block diagram rather than a listing of specific components.

Figure 15:
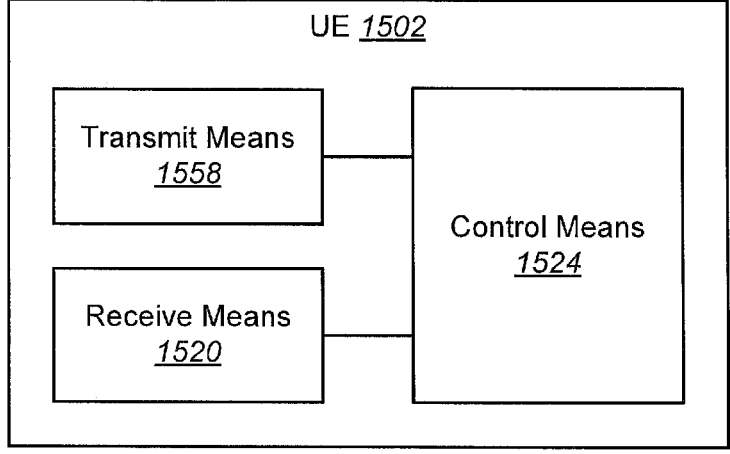
FIG. 15 is a block diagram illustrating one implementation of a UE in which the systems and methods described herein may be implemented.

FIG. 15 is a block diagram illustrating one implementation of a UE 1502 in which the systems and methods described herein may be implemented. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
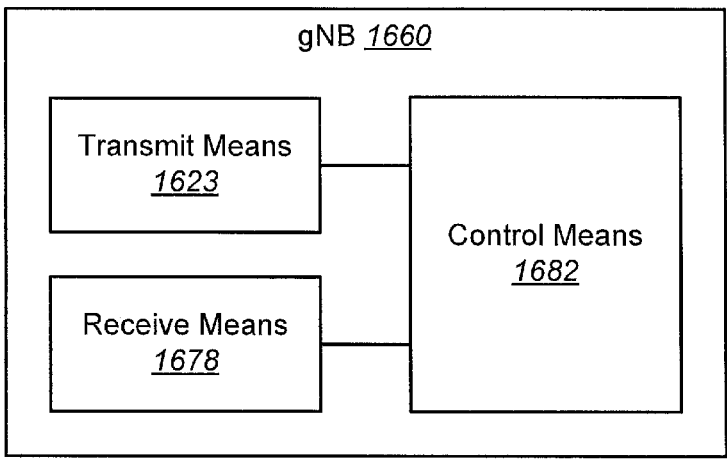
FIG. 16 is a block diagram illustrating one implementation of a gNB in which the systems and methods described herein may be implemented.

FIG. 16 is a block diagram illustrating one implementation of a gNB 1660 in which the systems and methods described herein may be implemented. The gNB 1660 includes transmit means 1623, receive means 1678 and control means 1682. The transmit means 1623, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

FIG. 17 is a flow diagram illustrating a method 1700 by a user equipment (UE) 102. The UE 102 may determine 1702 whether scheduling request (SR) reporting with hybrid automatic repeat request-acknowledgement (HARQ-ACK) with different priorities is supported, i.e. whether SR can be reported with HARQ-ACK with priority index 1 and HARQ-ACK with priority index 0. The UE 102 may generate 1704 SR bits for multiplexing with HARQ-ACK, wherein the HARQ-ACK may have different priorities, i.e. the HARQ-ACK may include HARQ-ACK with priority index 1 and HARQ-ACK with priority index 0. The UE 102 may multiplex 1706 the HARQ-ACK and the SR bits. The UE 102 may transmit 1708 the multiplexed HARQ-ACK and SR bits on a physical uplink control channel (PUCCH).

For a given priority, the SR bits may be generated and appended to HARQ-ACK bits with a same priority. For example, 1 SR bit may be generated to represent a positive or negative SR for up to 2 bits of HARQ-ACK with PUCCH format 0 or PUCCH format 1. In another example, SR bits are generated based on PUCCH format 2/3/4 regardless of HARQ-ACK payload size and PUCCH formats.

The SR bits may be generated based on PUCCH format 2/3/4 regardless of HARQ-ACK payload size and PUCCH formats. In another approach, the SR bits may be generated based on an overlapping condition between a determined PUCCH resource for joint reporting and an SR PUCCH configuration of the same priority.

In some examples, SR bits with low priority may be generated based on whether low priority SR reporting with high priority HARQ-ACK and low priority HARQ-ACK low priority SR is supported. If supported, bits for low priority SR may be generated in addition to bits for high priority SR. If not supported, only bits for high priority SR are generated if present, and no bit for low priority SR is generated.

Figure 18:
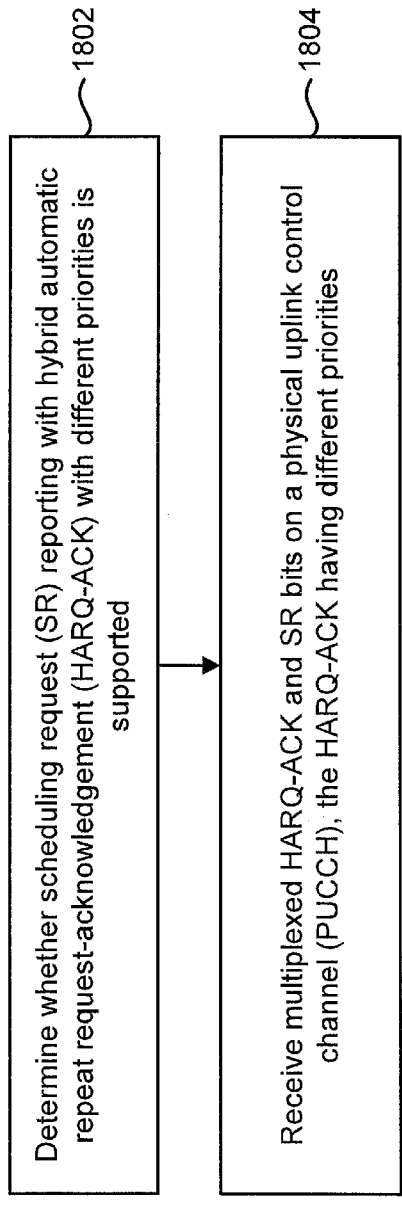
FIG. 18 is a flow diagram illustrating a method by a gNB.

FIG. 18 is a flow diagram illustrating a method 1800 by a base station (gNB) 160. The gNB 160 may determine 1802 whether scheduling request (SR) reporting with hybrid automatic repeat request-acknowledgement (HARQ-ACK) with different priorities is supported, i.e. whether SR can be reported with HARQ-ACK with priority index 1 and HARQ-ACK with priority index 0. The gNB can determine by configuring the features and parameters by higher layer signaling or by dynamic indication in a DCI for a PDSCH transmission with the corresponding HARQ-ACK contained in the HARQ-ACK report. The gNB 160 may receive 1804 multiplexed HARQ-ACK and SR bits on a physical uplink control channel (PUCCH). The HARQ-ACK may have different priorities.

Figure 19:
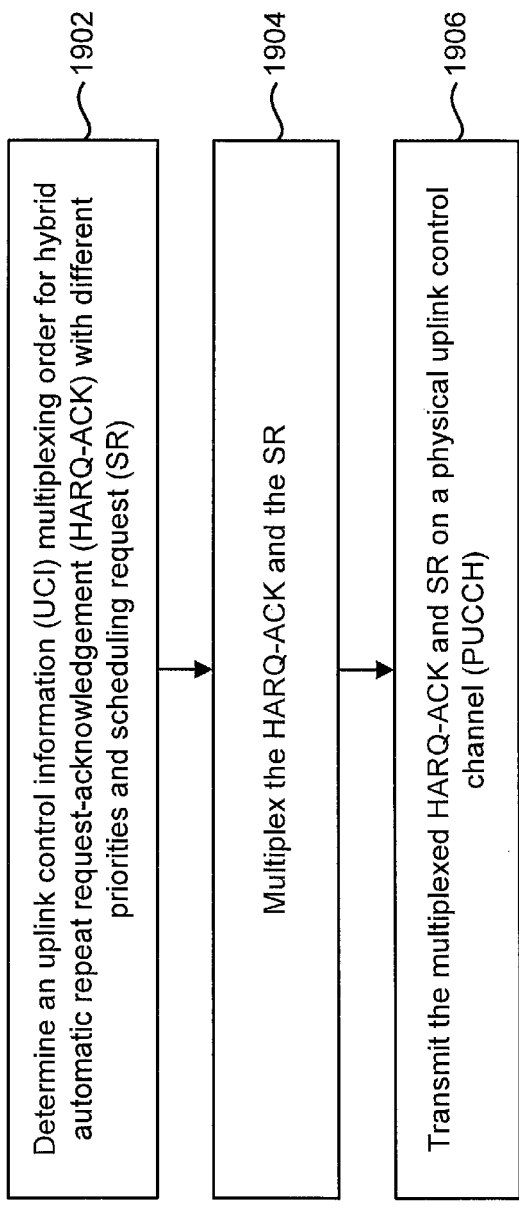
FIG. 19 is a flow diagram illustrating another method by a UE.

FIG. 19 is a flow diagram illustrating another method 1900 by a user equipment (UE) 102. The UE 102 may determine 1902 an uplink control information (UCI) multiplexing order for hybrid automatic repeat request-acknowledgement (HARQ-ACK) with different priorities and scheduling request (SR). The UE 102 may multiplex 1904 the HARQ-ACK and the SR. The UE 102 may transmit 1906 the multiplexed HARQ-ACK and SR on a physical uplink control channel (PUCCH).

In one approach, HARQ-ACK and SR with a same priority may be multiplexed first. Low priority HARQ-ACK with or without SR is then appended to high priority HARQ-ACK with or without SR. Both SRs with high priority and SRs with low priority may be reported. Alternatively, only SRs with high priority are reported.

In another approach, high priority HARQ-ACK and low priority HARQ-ACK are multiplexed first, then SR bits are generated and appended to joint HARQ-ACK bits. In one example, the SR bits are appended to the joint HARQ-ACK by counting SR with all priorities together based on SR indexes. In another example, SR bits are appended to the joint HARQ-ACK by counting SRs separately based on SR indexes with each priority. In yet another example, SR bits are appended to the joint HARQ-ACK with SRs with high priorities only.

In some examples, selection of the UCI multiplexing order is determined based on whether low priority SR reporting with high priority HARQ-ACK and low priority HARQ-ACK low priority SR is supported.

Figure 20:
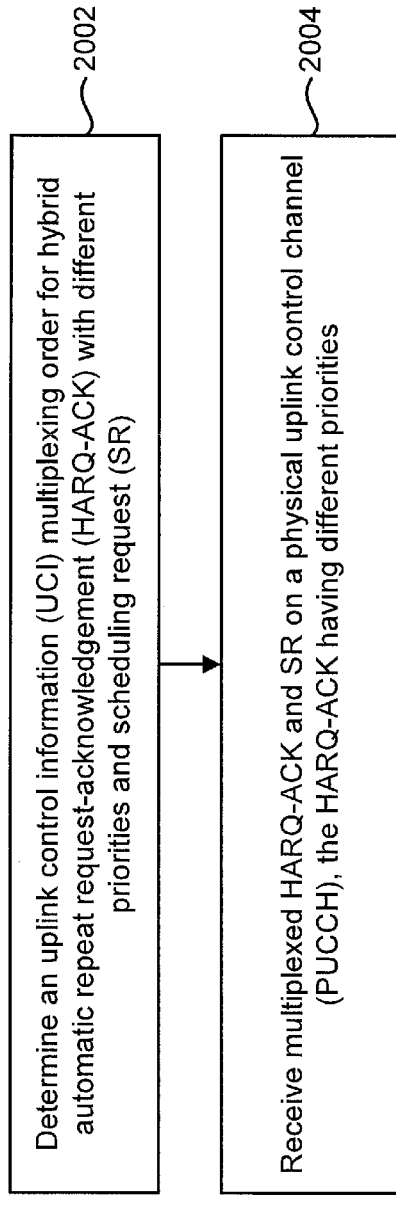
FIG. 20 is a flow diagram illustrating another method by a gNB.

FIG. 20 is a flow diagram illustrating another method 2000 by a base station (gNB) 160. The gNB 160 may determine 2002 an uplink control information (UCI) multiplexing order for hybrid automatic repeat request-acknowledgement (HARQ-ACK) with different priorities and scheduling request (SR). The gNB 160 may receive 2004 multiplexed HARQ-ACK and SR on a physical uplink control channel (PUCCH). The HARQ-ACK having different priorities.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

SUMMARY

In one example, a user equipment (UE), comprising: a processor configured to: determine an uplink control information (UCI) multiplexing order for hybrid automatic repeat request-acknowledgement (HARQ-ACK) with different priorities and scheduling request (SR); and multiplex the HARQ-ACK and the SR; and transmitting circuitry configured to transmit the multiplexed HARQ-ACK and SR on a physical uplink control channel (PUCCH).

In one example, the UE, wherein HARQ-ACK and SR with a same priority are multiplexed first, and wherein low priority HARQ-ACK with or without SR is then appended to high priority HARQ-ACK with or without SR.

In one example, the UE, wherein both SRs with high priority and SRs with low priority are reported.

In one example, the UE, wherein only SRs with high priority are reported.

In one example, the UE, wherein high priority HARQ-ACK and low priority HARQ-ACK are multiplexed first, then SR bits are generated and appended to joint HARQ-ACK bits.

In one example, the UE, wherein the SR bits are appended to the joint HARQ-ACK by counting SR with all priorities together based on SR indexes.

In one example, the UE, wherein SR bits are appended to the joint HARQ-ACK by counting SRs separately based on SR indexes with each priority.

In one example, the UE, wherein SR bits are appended to the joint HARQ-ACK with SRs with high priorities only.

In one example, the UE, selection of the UCI multiplexing order is determined based on whether low priority SR reporting with high priority HARQ-ACK and low priority HARQ-ACK low priority SR is supported.

In one example, a base station (gNB), comprising: a processor configured to determine an uplink control information (UCI) multiplexing order for hybrid automatic repeat request-acknowledgement (HARQ-ACK) with different priorities and scheduling request (SR); and receiving circuitry configured to receive multiplexed HARQ-ACK and SR on a physical uplink control channel (PUCCH), wherein the HARQ-ACK having different priorities.

In one example, the gNB, wherein HARQ-ACK and SR with a same priority are multiplexed first, and wherein low priority HARQ-ACK with or without SR is then appended to high priority HARQ-ACK with or without SR.

In one example, the gNB, wherein both SRs with high priority and SRs with low priority are reported.

In one example, the gNB, wherein only SRs with high priority are reported.

In one example, the gNB, wherein high priority HARQ-ACK and low priority HARQ-ACK are multiplexed first, then SR bits are generated and appended to joint HARQ-ACK bits.

In one example, the gNB, wherein the SR bits are appended to the joint HARQ-ACK by counting SR with all priorities together based on SR indexes.

In one example, the gNB, wherein SR bits are appended to the joint HARQ-ACK by counting SRs separately based on SR indexes with each priority.

In one example, the gNB, wherein SR bits are appended to the joint HARQ-ACK with SRs with high priorities only.

In one example, the gNB, selection of the UCI multiplexing order is determined based on whether low priority SR reporting with high priority HARQ-ACK and low priority HARQ-ACK low priority SR is supported.

In one example, a method by a user equipment (UE), comprising: determining an uplink control information (UCI) multiplexing order for hybrid automatic repeat request-acknowledgement (HARQ-ACK) with different priorities and scheduling request (SR); multiplexing the HARQ-ACK and the SR; and transmitting the multiplexed HARQ-ACK and SR on a physical uplink control channel (PUCCH).

In one example, a method by a base station (gNB), comprising: determining an uplink control information (UCI) multiplexing order for hybrid automatic repeat request-acknowledgement (HARQ-ACK) with different priorities and scheduling request (SR); and receiving multiplexed HARQ-ACK and SR on a physical uplink control channel (PUCCH), wherein the HARQ-ACK having different priorities.

In one example, a user equipment (UE), comprising: a processor configured to: determine multiplexing of UCI with different priorities is supported, and there are overlapping between PUCCH transmission with high priority hybrid automatic repeat request-acknowledgement (HARQ-ACK), PUCCH transmission with low priority HARQ-ACK, and at least one PUCCH resource for scheduling request (SR) with high priority, and determine an uplink control information (UCI) multiplexing order for hybrid automatic repeat request-acknowledgement (HARQ-ACK) with different priorities and scheduling request (SR); and multiplex the HARQ-ACK and the SR; and transmitting circuitry configured to transmit the multiplexed HARQ-ACK and SR on a physical uplink control channel (PUCCH) resource configured for high priority HARQ-ACK based on the total payloads.

In one example, the UE, wherein HARQ-ACK and SR with a same priority are multiplexed first, and wherein low priority HARQ-ACK with or without SR is then appended to high priority HARQ-ACK with or without SR.

In one example, the UE, wherein both SRs with high priority and SRs with low priority are reported, and the multiplexing order is given by HARQ-ACK with high priority, SR with high priority, HARQ-ACK with low priority, and SR with low priority.

In one example, the UE, wherein only SRs with high priority are reported, and the multiplexing order is given by HARQ-ACK with high priority, SR with high priority, and HARQ-ACK with low priority.

In one example, the UE, wherein high priority HARQ-ACK and low priority HARQ-ACK are multiplexed first, then SR bits are generated and appended to joint HARQ-ACK bits.

In one example, the UE, wherein the SR bits are appended to the joint HARQ-ACK by counting SR with all priorities together based on SR indexes, and the multiplexing order is given by HARQ-ACK with high priority, HARQ-ACK with low priority, and SR with all priorities.

In one example, the UE, wherein SR bits are appended to the joint HARQ-ACK with SRs with high priorities only, and the multiplexing order is given by HARQ-ACK with high priority, HARQ-ACK with low priority, and SR with high priority.

In one example, a base station (gNB), comprising: a processor configured to determine multiplexing of UCI with different priorities is supported, and there are overlapping between PUCCH transmission with high priority hybrid automatic repeat request-acknowledgement (HARQ-ACK), PUCCH transmission with low priority HARQ-ACK, and at least one PUCCH resource for scheduling request (SR) with high priority, and determine an uplink control information (UCI) multiplexing order for hybrid automatic repeat request-acknowledgement (HARQ-ACK) with different priorities and scheduling request (SR); and receiving circuitry configured to receive multiplexed HARQ-ACK and SR on a physical uplink control channel (PUCCH) resource configured for high priority HARQ-ACK based on the total payloads, wherein the HARQ-ACK having different priorities.

In one example, the gNB, wherein HARQ-ACK and SR with a same priority are multiplexed first, and wherein low priority HARQ-ACK with or without SR is then appended to high priority HARQ-ACK with or without SR.

In one example, the gNB, wherein both SRs with high priority and SRs with low priority are reported, and the multiplexing order is given by HARQ-ACK with high priority, SR with high priority, HARQ-ACK with low priority, and SR with low priority.

In one example, the gNB, wherein only SRs with high priority are reported, and the multiplexing order is given by HARQ-ACK with high priority, SR with high priority, and HARQ-ACK with low priority.

In one example, the gNB, wherein high priority HARQ-ACK and low priority HARQ-ACK are multiplexed first, then SR bits are generated and appended to joint HARQ-ACK bits.

In one example, the gNB, wherein the SR bits are appended to the joint HARQ-ACK by counting SR with all priorities together based on SR indexes, and the multiplexing order is given by HARQ-ACK with high priority, HARQ-ACK with low priority, and SR with all priorities.

In one example, the gNB, wherein SR bits are appended to the joint HARQ-ACK with SRs with high priorities only, and the multiplexing order is given by HARQ-ACK with high priority, HARQ-ACK with low priority, and SR with high priority.

In one example, a method by a user equipment (UE), comprising: determining multiplexing of UCI with different priorities is supported, and there are overlapping between PUCCH transmission with high priority hybrid automatic repeat request-acknowledgement (HARQ-ACK), PUCCH transmission with low priority HARQ-ACK, and at least one PUCCH resource for scheduling request (SR) with high priority, and determining an uplink control information (UCI) multiplexing order for hybrid automatic repeat request-acknowledgement HARQ-ACK) with different priorities and scheduling request (SR); multiplexing the HARQ-ACK and the SR; and transmitting the multiplexed HARQ-ACK and SR on a physical uplink control channel (PUCCH).

What is claimed is:

1. A user equipment (UE), comprising:
a processor configured to:
   identify an overlapping between a first physical uplink control channel (PUCCH) transmission with high priority hybrid automatic repeat request-acknowledgement (HARQ-ACK) and a second PUCCH transmission with low priority HARQ-ACK,
   identify an overlapping between the first PUCCH transmission and at least one transmission occasion for a high priority scheduling request (SR),
   determine an uplink control information (UCI) multiplexing order for HARQ-ACK with different priorities and the high priority SR, wherein:
      the high priority SR is appended to the high priority HARQ-ACK, and then appended by the low priority HARQ-ACK, and
      the UCI multiplexing order is such that the high-priority HARQ-ACK is multiplexed first, the high-priority SR is multiplexed second, and the low-priority HARQ-ACK is multiplexed last, and
   multiplex the high priority HARQ-ACK, the high priority SR, and the low priority HARQ-ACK on a PUCCH resource based on the UCI multiplexing order; and
transmitting circuitry configured to transmit multiplexed high priority HARQ-ACK, high priority SR and low priority HARQ-ACK bits on the PUCCH resource.

2. A method performed by a user equipment (UE), the method comprising:
   identifying an overlapping between a first physical uplink control channel (PUCCH) transmission with high priority hybrid automatic repeat request-acknowledgement (HARQ-ACK) and a second PUCCH transmission with low priority HARQ-ACK;
   identifying an overlapping between the first PUCCH transmission and at least one transmission occasion for a high priority scheduling request (SR),
   determining an uplink control information (UCI) multiplexing order for HARQ-ACK with different priorities and the high priority SR, wherein:
      the high priority SR is appended to the high priority HARQ-ACK, and then appended by the low priority HARQ-ACK, and
      the UCI multiplexing order is such that the high-priority HARQ-ACK is multiplexed first, the high-priority SR is multiplexed second, and the low-priority HARQ-ACK is multiplexed last;
   multiplexing the high priority HARQ-ACK, the high priority SR, and the low priority HARQ-ACK on PUCCH resource based on the UCI multiplexing order; and
   transmitting multiplexed high priority HARQ-ACK, high priority SR and low priority HARQ-ACK bits on the PUCCH resource.

* * * * *